United States Patent
Xu et al.

(10) Patent No.: US 10,365,836 B1
(45) Date of Patent: Jul. 30, 2019

(54) ELECTRONIC SYSTEM WITH DECLUSTERED DATA PROTECTION BY PARITY BASED ON RELIABILITY AND METHOD OF OPERATION THEREOF

(71) Applicant: Western Digital Technologies, Inc., Irvine, CA (US)

(72) Inventors: Jun Xu, Singapore (SG); Wei Xi, Mission Viejo, CA (US); Grant Mackey, Irvine, CA (US); Sanghoon Chu, San Jose, CA (US); Jie Yu, Irvine, CA (US)

(73) Assignee: WESTERN DIGITAL TECHNOLOGIES, INC., San Jose, CA (US)

( * ) Notice: Subject to any disclaimer, the term of this patent is extended or adjusted under 35 U.S.C. 154(b) by 0 days.

(21) Appl. No.: 14/607,055

(22) Filed: Jan. 27, 2015

(51) Int. Cl.
G06F 3/06 (2006.01)
G06F 11/10 (2006.01)

(52) U.S. Cl.
CPC .......... *G06F 3/0619* (2013.01); *G06F 3/0644* (2013.01); *G06F 3/0647* (2013.01); *G06F 3/0689* (2013.01); *G06F 11/1076* (2013.01)

(58) Field of Classification Search
CPC .............................................. G06F 2211/1011
See application file for complete search history.

(56) References Cited

U.S. PATENT DOCUMENTS

| | | | |
|---|---|---|---|
| 6,018,789 A | 1/2000 | Sokolov et al. | |
| 6,065,095 A | 5/2000 | Sokolov et al. | |
| 6,078,452 A | 6/2000 | Kittilson et al. | |
| 6,081,447 A | 6/2000 | Lofgren et al. | |
| 6,092,149 A | 7/2000 | Hicken et al. | |
| 6,092,150 A | 7/2000 | Sokolov et al. | |
| 6,094,707 A | 7/2000 | Sokolov et al. | |
| 6,105,104 A | 8/2000 | Guttmann et al. | |
| 6,111,717 A | 8/2000 | Cloke et al. | |
| 6,145,052 A | 11/2000 | Howe et al. | |
| 6,175,893 B1 | 1/2001 | D'Souza et al. | |
| 6,178,056 B1 | 1/2001 | Cloke et al. | |
| 6,191,909 B1 | 2/2001 | Cloke et al. | |
| 6,195,218 B1 | 2/2001 | Guttmann et al. | |
| 6,205,494 B1 | 3/2001 | Williams | |
| 6,208,477 B1 | 3/2001 | Cloke et al. | |
| 6,223,303 B1 | 4/2001 | Billings et al. | |
| 6,230,233 B1 | 5/2001 | Lofgren et al. | |

(Continued)

OTHER PUBLICATIONS

Productivity—Quality Systems, Inc., "Sampling," Oct. 27, 2014, https://web.archive.org/web/20141027071415/www.pqsystems.com/qualityadvisor/DataCollectionTools/sampling.php, downloaded Jul. 11, 2018.*

(Continued)

*Primary Examiner* — Tracy A Warren
(74) *Attorney, Agent, or Firm* — Foley & Lardner LLP

(57) ABSTRACT

An apparatus includes: an adaptive declustered RAID array configured of data storage devices (DSDs), the DSDs comprise data chunks allocated as data, a local parity, or a global parity; and a controller configured to generate a reliability indicator reflective of a reliability status of at least a portion of the adaptive declustered RAID array for reallocating the data chunks by dynamically increasing or decreasing the data chunks allocated as the local parity, the global parity, or a combination thereof.

31 Claims, 8 Drawing Sheets

(56) References Cited

U.S. PATENT DOCUMENTS

| | | |
|---|---|---|
| 6,246,346 B1 | 6/2001 | Cloke et al. |
| 6,249,393 B1 | 6/2001 | Billings et al. |
| 6,256,695 B1 | 7/2001 | Williams |
| 6,262,857 B1 | 7/2001 | Hull et al. |
| 6,263,459 B1 | 7/2001 | Schibilla |
| 6,272,694 B1 | 8/2001 | Weaver et al. |
| 6,278,568 B1 | 8/2001 | Cloke et al. |
| 6,279,089 B1 | 8/2001 | Schibilla et al. |
| 6,289,484 B1 | 9/2001 | Rothberg et al. |
| 6,292,912 B1 | 9/2001 | Cloke et al. |
| 6,310,740 B1 | 10/2001 | Dunbar et al. |
| 6,317,850 B1 | 11/2001 | Rothberg |
| 6,327,106 B1 | 12/2001 | Rothberg |
| 6,337,778 B1 | 1/2002 | Gagne |
| 6,369,969 B1 | 4/2002 | Christiansen et al. |
| 6,384,999 B1 | 5/2002 | Schibilla |
| 6,388,833 B1 | 5/2002 | Golowka et al. |
| 6,405,342 B1 | 6/2002 | Lee |
| 6,408,357 B1 | 6/2002 | Hanmann et al. |
| 6,408,406 B1 | 6/2002 | Parris |
| 6,411,452 B1 | 6/2002 | Cloke |
| 6,411,458 B1 | 6/2002 | Billings et al. |
| 6,412,083 B1 | 6/2002 | Rothberg et al. |
| 6,415,349 B1 | 7/2002 | Hull et al. |
| 6,425,128 B1 | 7/2002 | Krapf et al. |
| 6,441,981 B1 | 8/2002 | Cloke et al. |
| 6,442,328 B1 | 8/2002 | Elliott et al. |
| 6,445,524 B1 | 9/2002 | Nazarian et al. |
| 6,449,767 B1 | 9/2002 | Krapf et al. |
| 6,453,115 B1 | 9/2002 | Boyle |
| 6,470,420 B1 | 10/2002 | Hospodor |
| 6,480,020 B1 | 11/2002 | Jung et al. |
| 6,480,349 B1 | 11/2002 | Kim et al. |
| 6,480,932 B1 | 11/2002 | Vallis et al. |
| 6,483,986 B1 | 11/2002 | Krapf |
| 6,487,032 B1 | 11/2002 | Cloke et al. |
| 6,490,635 B1 | 12/2002 | Holmes |
| 6,493,173 B1 | 12/2002 | Kim et al. |
| 6,499,083 B1 | 12/2002 | Hamlin |
| 6,519,104 B1 | 2/2003 | Cloke et al. |
| 6,525,892 B1 | 2/2003 | Dunbar et al. |
| 6,545,830 B1 | 4/2003 | Briggs |
| 6,546,489 B1 | 4/2003 | Frank, Jr. et al. |
| 6,550,021 B1 | 4/2003 | Dalphy et al. |
| 6,552,880 B1 | 4/2003 | Dunbar et al. |
| 6,553,457 B1 | 4/2003 | Wilkins et al. |
| 6,574,754 B1 * | 6/2003 | Smith ............... G11B 27/36 706/26 |
| 6,578,106 B1 | 6/2003 | Price |
| 6,580,573 B1 | 6/2003 | Hull et al. |
| 6,594,183 B1 | 7/2003 | Lofgren et al. |
| 6,600,620 B1 | 7/2003 | Krounbi et al. |
| 6,601,137 B1 | 7/2003 | Castro et al. |
| 6,603,622 B1 | 8/2003 | Christiansen et al. |
| 6,603,625 B1 | 8/2003 | Hospodor et al. |
| 6,604,220 B1 | 8/2003 | Lee |
| 6,606,682 B1 | 8/2003 | Dang et al. |
| 6,606,714 B1 | 8/2003 | Thelin |
| 6,606,717 B1 | 8/2003 | Yu et al. |
| 6,611,393 B1 | 8/2003 | Nguyen et al. |
| 6,615,312 B1 | 9/2003 | Hamlin et al. |
| 6,639,748 B1 | 10/2003 | Christiansen et al. |
| 6,647,481 B1 | 11/2003 | Luu et al. |
| 6,654,193 B1 | 11/2003 | Thelin |
| 6,657,810 B1 | 12/2003 | Kupferman |
| 6,661,591 B1 | 12/2003 | Rothberg |
| 6,665,772 B1 | 12/2003 | Hamlin |
| 6,687,073 B1 | 2/2004 | Kupferman |
| 6,687,078 B1 | 2/2004 | Kim |
| 6,687,850 B1 | 2/2004 | Rothberg |
| 6,690,523 B1 | 2/2004 | Nguyen et al. |
| 6,690,882 B1 | 2/2004 | Hanmann et al. |
| 6,691,198 B1 | 2/2004 | Hamlin |
| 6,691,213 B1 | 2/2004 | Luu et al. |
| 6,691,255 B1 | 2/2004 | Rothberg et al. |
| 6,693,760 B1 | 2/2004 | Krounbi et al. |
| 6,694,477 B1 | 2/2004 | Lee |
| 6,697,914 B1 | 2/2004 | Hospodor et al. |
| 6,704,153 B1 | 3/2004 | Rothberg et al. |
| 6,708,251 B1 | 3/2004 | Boyle et al. |
| 6,710,951 B1 | 3/2004 | Cloke |
| 6,711,628 B1 | 3/2004 | Thelin |
| 6,711,635 B1 | 3/2004 | Wang |
| 6,711,660 B1 | 3/2004 | Milne et al. |
| 6,715,044 B2 | 3/2004 | Lofgren et al. |
| 6,724,982 B1 | 4/2004 | Hamlin |
| 6,725,329 B1 | 4/2004 | Ng et al. |
| 6,735,650 B1 | 5/2004 | Rothberg |
| 6,735,693 B1 | 5/2004 | Hamlin |
| 6,744,772 B1 | 6/2004 | Eneboe et al. |
| 6,745,283 B1 | 6/2004 | Dang |
| 6,751,402 B1 | 6/2004 | Elliott et al. |
| 6,757,481 B1 | 6/2004 | Nazarian et al. |
| 6,772,281 B2 | 8/2004 | Hamlin |
| 6,781,826 B1 | 8/2004 | Goldstone et al. |
| 6,782,449 B1 | 8/2004 | Codilian et al. |
| 6,791,779 B1 | 9/2004 | Singh et al. |
| 6,792,486 B1 | 9/2004 | Hanan et al. |
| 6,799,274 B1 | 9/2004 | Hamlin |
| 6,811,427 B2 | 11/2004 | Garrett et al. |
| 6,826,003 B1 | 11/2004 | Subrahmanyam |
| 6,826,614 B1 | 11/2004 | Hanmann et al. |
| 6,832,041 B1 | 12/2004 | Boyle |
| 6,832,929 B2 | 12/2004 | Garrett et al. |
| 6,845,405 B1 | 1/2005 | Thelin |
| 6,845,427 B1 | 1/2005 | Atai-Azimi |
| 6,850,443 B2 | 2/2005 | Lofgren et al. |
| 6,851,055 B1 | 2/2005 | Boyle et al. |
| 6,851,063 B1 | 2/2005 | Boyle et al. |
| 6,853,731 B1 | 2/2005 | Boyle et al. |
| 6,854,022 B1 | 2/2005 | Thelin |
| 6,862,660 B1 | 3/2005 | Wilkins et al. |
| 6,880,043 B1 | 4/2005 | Castro et al. |
| 6,882,486 B1 | 4/2005 | Kupferman |
| 6,884,085 B1 | 4/2005 | Goldstone |
| 6,888,831 B1 | 5/2005 | Hospodor et al. |
| 6,892,217 B1 | 5/2005 | Hanmann et al. |
| 6,892,249 B1 | 5/2005 | Codilian et al. |
| 6,892,313 B1 | 5/2005 | Codilian et al. |
| 6,895,455 B1 | 5/2005 | Rothberg |
| 6,895,500 B1 | 5/2005 | Rothberg |
| 6,898,730 B1 | 5/2005 | Hanan |
| 6,910,099 B1 | 6/2005 | Wang et al. |
| 6,928,470 B1 | 8/2005 | Hamlin |
| 6,931,439 B1 | 8/2005 | Hanmann et al. |
| 6,934,104 B1 | 8/2005 | Kupferman |
| 6,934,713 B2 | 8/2005 | Schwartz et al. |
| 6,940,873 B2 | 9/2005 | Boyle et al. |
| 6,943,978 B1 | 9/2005 | Lee |
| 6,948,165 B1 | 9/2005 | Luu et al. |
| 6,950,267 B1 | 9/2005 | Liu et al. |
| 6,954,733 B1 | 10/2005 | Ellis et al. |
| 6,961,814 B1 | 11/2005 | Thelin et al. |
| 6,965,489 B1 | 11/2005 | Lee et al. |
| 6,965,563 B1 | 11/2005 | Hospodor et al. |
| 6,965,966 B1 | 11/2005 | Rothberg et al. |
| 6,967,799 B1 | 11/2005 | Lee |
| 6,968,422 B1 | 11/2005 | Codilian et al. |
| 6,968,450 B1 | 11/2005 | Rothberg et al. |
| 6,973,495 B1 | 12/2005 | Milne et al. |
| 6,973,570 B1 | 12/2005 | Hamlin |
| 6,976,190 B1 | 12/2005 | Goldstone |
| 6,983,316 B1 | 1/2006 | Milne et al. |
| 6,986,007 B1 | 1/2006 | Procyk et al. |
| 6,986,154 B1 | 1/2006 | Price et al. |
| 6,995,933 B1 | 2/2006 | Codilian et al. |
| 6,996,501 B1 | 2/2006 | Rothberg |
| 6,996,669 B1 | 2/2006 | Dang et al. |
| 7,002,926 B1 | 2/2006 | Eneboe et al. |
| 7,003,674 B1 | 2/2006 | Hamlin |
| 7,006,316 B1 | 2/2006 | Sargenti, Jr. et al. |
| 7,009,820 B1 | 3/2006 | Hogg |
| 7,023,639 B1 | 4/2006 | Kupferman |
| 7,024,491 B1 | 4/2006 | Hanmann et al. |

(56) References Cited

U.S. PATENT DOCUMENTS

| | | |
|---|---|---|
| 7,024,549 B1 | 4/2006 | Luu et al. |
| 7,024,614 B1 | 4/2006 | Thelin et al. |
| 7,027,716 B1 | 4/2006 | Boyle et al. |
| 7,028,174 B1 | 4/2006 | Atai-Azimi et al. |
| 7,031,902 B1 | 4/2006 | Catiller |
| 7,046,465 B1 | 5/2006 | Kupferman |
| 7,046,488 B1 | 5/2006 | Hogg |
| 7,050,252 B1 | 5/2006 | Vallis |
| 7,054,937 B1 | 5/2006 | Milne et al. |
| 7,055,000 B1 | 5/2006 | Severtson |
| 7,055,167 B1 | 5/2006 | Masters |
| 7,057,836 B1 | 6/2006 | Kupferman |
| 7,062,398 B1 | 6/2006 | Rothberg |
| 7,075,746 B1 | 7/2006 | Kupferman |
| 7,076,604 B1 | 7/2006 | Thelin |
| 7,082,494 B1 | 7/2006 | Thelin et al. |
| 7,088,538 B1 | 8/2006 | Codilian et al. |
| 7,088,545 B1 | 8/2006 | Singh et al. |
| 7,092,186 B1 | 8/2006 | Hogg |
| 7,095,577 B1 | 8/2006 | Codilian et al. |
| 7,099,095 B1 | 8/2006 | Subrahmanyam et al. |
| 7,106,537 B1 | 9/2006 | Bennett |
| 7,106,947 B2 | 9/2006 | Boyle et al. |
| 7,110,202 B1 | 9/2006 | Vasquez |
| 7,111,116 B1 | 9/2006 | Boyle et al. |
| 7,114,029 B1 | 9/2006 | Thelin |
| 7,120,737 B1 | 10/2006 | Thelin |
| 7,120,806 B1 | 10/2006 | Codilian et al. |
| 7,126,776 B1 | 10/2006 | Warren, Jr. et al. |
| 7,129,763 B1 | 10/2006 | Bennett et al. |
| 7,133,600 B1 | 11/2006 | Boyle |
| 7,136,244 B1 | 11/2006 | Rothberg |
| 7,146,094 B1 | 12/2006 | Boyle |
| 7,149,046 B1 | 12/2006 | Coker et al. |
| 7,150,036 B1 | 12/2006 | Milne et al. |
| 7,155,616 B1 | 12/2006 | Hamlin |
| 7,171,108 B1 | 1/2007 | Masters et al. |
| 7,171,110 B1 | 1/2007 | Wilshire |
| 7,194,576 B1 | 3/2007 | Boyle |
| 7,200,698 B1 | 4/2007 | Rothberg |
| 7,205,805 B1 | 4/2007 | Bennett |
| 7,206,497 B1 | 4/2007 | Boyle et al. |
| 7,215,496 B1 | 5/2007 | Kupferman et al. |
| 7,215,771 B1 | 5/2007 | Hamlin |
| 7,237,054 B1 | 6/2007 | Cain et al. |
| 7,240,161 B1 | 7/2007 | Boyle |
| 7,249,365 B1 | 7/2007 | Price et al. |
| 7,263,709 B1 | 8/2007 | Krapf |
| 7,274,639 B1 | 9/2007 | Codilian et al. |
| 7,274,659 B2 | 9/2007 | Hospodor |
| 7,275,116 B1 | 9/2007 | Hanmann et al. |
| 7,280,302 B1 | 10/2007 | Masiewicz |
| 7,292,774 B1 | 11/2007 | Masters et al. |
| 7,292,775 B1 | 11/2007 | Boyle et al. |
| 7,296,284 B1 | 11/2007 | Price et al. |
| 7,302,501 B1 | 11/2007 | Cain et al. |
| 7,302,579 B1 | 11/2007 | Cain et al. |
| 7,318,088 B1 | 1/2008 | Mann |
| 7,319,806 B1 | 1/2008 | Willner et al. |
| 7,325,244 B2 | 1/2008 | Boyle et al. |
| 7,330,323 B1 | 2/2008 | Singh et al. |
| 7,346,790 B1 | 3/2008 | Klein |
| 7,366,641 B1 | 4/2008 | Masiewicz et al. |
| 7,369,340 B1 | 5/2008 | Dang et al. |
| 7,369,343 B1 | 5/2008 | Yeo et al. |
| 7,372,650 B1 | 5/2008 | Kupferman |
| 7,380,147 B1 | 5/2008 | Sun |
| 7,392,340 B1 | 6/2008 | Dang et al. |
| 7,404,013 B1 | 7/2008 | Masiewicz |
| 7,406,545 B1 | 7/2008 | Rothberg et al. |
| 7,415,571 B1 | 8/2008 | Hanan |
| 7,436,610 B1 | 10/2008 | Thelin |
| 7,437,502 B1 | 10/2008 | Coker |
| 7,440,214 B1 | 10/2008 | Ell et al. |
| 7,451,344 B1 | 11/2008 | Rothberg |
| 7,471,483 B1 | 12/2008 | Ferris et al. |
| 7,471,486 B1 | 12/2008 | Coker et al. |
| 7,486,060 B1 | 2/2009 | Bennett |
| 7,496,493 B1 | 2/2009 | Stevens |
| 7,518,819 B1 | 4/2009 | Yu et al. |
| 7,526,184 B1 | 4/2009 | Parkinen et al. |
| 7,539,924 B1 | 5/2009 | Vasquez et al. |
| 7,543,117 B1 | 6/2009 | Hanan |
| 7,551,383 B1 | 6/2009 | Kupferman |
| 7,562,282 B1 | 7/2009 | Rothberg |
| 7,577,973 B1 | 8/2009 | Kapner, III et al. |
| 7,596,797 B1 | 9/2009 | Kapner, III et al. |
| 7,599,139 B1 | 10/2009 | Bombet et al. |
| 7,619,841 B1 | 11/2009 | Kupferman |
| 7,647,544 B1 | 1/2010 | Masiewicz |
| 7,649,704 B1 | 1/2010 | Bombet et al. |
| 7,653,927 B1 | 1/2010 | Kapner, III et al. |
| 7,656,603 B1 | 2/2010 | Xing |
| 7,656,763 B1 | 2/2010 | Jin et al. |
| 7,657,149 B2 | 2/2010 | Boyle |
| 7,672,072 B1 | 3/2010 | Boyle et al. |
| 7,673,075 B1 | 3/2010 | Masiewicz |
| 7,688,540 B1 | 3/2010 | Mei et al. |
| 7,724,461 B1 | 5/2010 | McFadyen et al. |
| 7,725,584 B1 | 5/2010 | Hanmann et al. |
| 7,730,295 B1 | 6/2010 | Lee |
| 7,760,458 B1 | 7/2010 | Trinh |
| 7,768,776 B1 | 8/2010 | Szeremeta et al. |
| 7,804,657 B1 | 9/2010 | Hogg et al. |
| 7,813,954 B1 | 10/2010 | Price et al. |
| 7,827,320 B1 | 11/2010 | Stevens |
| 7,839,588 B1 | 11/2010 | Dang et al. |
| 7,843,660 B1 | 11/2010 | Yeo |
| 7,852,596 B2 | 12/2010 | Boyle et al. |
| 7,859,782 B1 | 12/2010 | Lee |
| 7,872,822 B1 | 1/2011 | Rothberg |
| 7,898,756 B1 | 3/2011 | Wang |
| 7,898,762 B1 | 3/2011 | Guo et al. |
| 7,900,037 B1 | 3/2011 | Fallone et al. |
| 7,907,364 B2 | 3/2011 | Boyle et al. |
| 7,929,234 B1 | 4/2011 | Boyle et al. |
| 7,933,087 B1 | 4/2011 | Tsai et al. |
| 7,933,090 B1 | 4/2011 | Jung et al. |
| 7,934,030 B1 | 4/2011 | Sargenti, Jr. et al. |
| 7,940,491 B2 | 5/2011 | Szeremeta et al. |
| 7,944,639 B1 | 5/2011 | Wang |
| 7,945,727 B2 | 5/2011 | Rothberg et al. |
| 7,949,564 B1 | 5/2011 | Hughes et al. |
| 7,974,029 B2 | 7/2011 | Tsai et al. |
| 7,974,039 B1 | 7/2011 | Xu et al. |
| 7,982,993 B1 | 7/2011 | Tsai et al. |
| 7,984,200 B1 | 7/2011 | Bombet et al. |
| 7,990,648 B1 | 8/2011 | Wang |
| 7,992,179 B1 | 8/2011 | Kapner, III et al. |
| 8,004,785 B1 | 8/2011 | Tsai et al. |
| 8,006,027 B1 | 8/2011 | Stevens et al. |
| 8,014,094 B1 | 9/2011 | Jin |
| 8,014,977 B1 | 9/2011 | Masiewicz et al. |
| 8,019,914 B1 | 9/2011 | Vasquez et al. |
| 8,040,625 B1 | 10/2011 | Boyle et al. |
| 8,078,943 B1 | 12/2011 | Lee |
| 8,079,045 B2 | 12/2011 | Krapf et al. |
| 8,082,433 B1 | 12/2011 | Fallone et al. |
| 8,085,487 B1 | 12/2011 | Jung et al. |
| 8,089,719 B1 | 1/2012 | Dakroub |
| 8,090,902 B1 | 1/2012 | Bennett et al. |
| 8,090,906 B1 | 1/2012 | Blaha et al. |
| 8,091,112 B1 | 1/2012 | Elliott et al. |
| 8,094,396 B1 | 1/2012 | Zhang et al. |
| 8,094,401 B1 | 1/2012 | Peng et al. |
| 8,116,020 B1 | 2/2012 | Lee |
| 8,116,025 B1 | 2/2012 | Chan et al. |
| 8,134,793 B1 | 3/2012 | Vasquez et al. |
| 8,134,798 B1 | 3/2012 | Thelin et al. |
| 8,139,301 B1 | 3/2012 | Li et al. |
| 8,139,310 B1 | 3/2012 | Hogg |
| 8,144,419 B1 | 3/2012 | Liu |
| 8,145,452 B1 | 3/2012 | Masiewicz et al. |
| 8,149,528 B1 | 4/2012 | Suratman et al. |

(56) References Cited

U.S. PATENT DOCUMENTS

| | | |
|---|---|---|
| 8,154,812 B1 | 4/2012 | Boyle et al. |
| 8,159,768 B1 | 4/2012 | Miyamura |
| 8,161,328 B1 | 4/2012 | Wilshire |
| 8,164,849 B1 | 4/2012 | Szeremeta et al. |
| 8,174,780 B1 | 5/2012 | Tsai et al. |
| 8,190,575 B1 | 5/2012 | Ong et al. |
| 8,194,338 B1 | 6/2012 | Zhang |
| 8,194,340 B1 | 6/2012 | Boyle et al. |
| 8,194,341 B1 | 6/2012 | Boyle |
| 8,201,066 B1 | 6/2012 | Wang |
| 8,271,692 B1 | 9/2012 | Dinh et al. |
| 8,279,550 B1 | 10/2012 | Hogg |
| 8,281,218 B1 | 10/2012 | Ybarra et al. |
| 8,285,923 B2 | 10/2012 | Stevens |
| 8,289,656 B1 | 10/2012 | Huber |
| 8,305,705 B1 | 11/2012 | Roohr |
| 8,307,156 B1 | 11/2012 | Codilian et al. |
| 8,310,775 B1 | 11/2012 | Boguslawski et al. |
| 8,315,006 B1 | 11/2012 | Chahwan et al. |
| 8,316,263 B1 | 11/2012 | Gough et al. |
| 8,320,067 B1 | 11/2012 | Tsai et al. |
| 8,324,974 B1 | 12/2012 | Bennett |
| 8,332,695 B2 | 12/2012 | Dalphy et al. |
| 8,341,337 B1 | 12/2012 | Ong et al. |
| 8,350,628 B1 | 1/2013 | Bennett |
| 8,356,184 B1 | 1/2013 | Meyer et al. |
| 8,370,683 B1 | 2/2013 | Ryan et al. |
| 8,375,225 B1 | 2/2013 | Ybarra |
| 8,375,274 B1 | 2/2013 | Bonke |
| 8,380,922 B1 | 2/2013 | DeForest et al. |
| 8,390,948 B2 | 3/2013 | Hogg |
| 8,390,952 B1 | 3/2013 | Szeremeta |
| 8,392,689 B1 | 3/2013 | Lott |
| 8,407,393 B1 | 3/2013 | Yolar et al. |
| 8,413,010 B1 | 4/2013 | Vasquez et al. |
| 8,417,566 B2 | 4/2013 | Price et al. |
| 8,421,663 B1 | 4/2013 | Bennett |
| 8,422,172 B1 | 4/2013 | Dakroub et al. |
| 8,427,771 B1 | 4/2013 | Tsai |
| 8,429,343 B1 | 4/2013 | Tsai |
| 8,433,937 B1 | 4/2013 | Wheelock et al. |
| 8,433,977 B1 | 4/2013 | Vasquez et al. |
| 8,453,036 B1 * | 5/2013 | Goel .................. G06F 11/1096 714/763 |
| 8,458,526 B2 | 6/2013 | Dalphy et al. |
| 8,462,466 B2 | 6/2013 | Huber |
| 8,467,151 B1 | 6/2013 | Huber |
| 8,489,841 B1 | 7/2013 | Strecke et al. |
| 8,493,679 B1 | 7/2013 | Boguslawski et al. |
| 8,498,074 B1 | 7/2013 | Mobley et al. |
| 8,499,198 B1 | 7/2013 | Messenger et al. |
| 8,512,049 B1 | 8/2013 | Huber et al. |
| 8,514,506 B1 | 8/2013 | Li et al. |
| 8,531,791 B1 | 9/2013 | Reid et al. |
| 8,554,741 B1 | 10/2013 | Malina |
| 8,560,759 B1 | 10/2013 | Boyle et al. |
| 8,565,053 B1 | 10/2013 | Chung |
| 8,576,511 B1 | 11/2013 | Coker et al. |
| 8,578,100 B1 | 11/2013 | Huynh et al. |
| 8,578,242 B1 | 11/2013 | Burton et al. |
| 8,589,773 B1 | 11/2013 | Wang et al. |
| 8,593,753 B1 | 11/2013 | Anderson |
| 8,595,432 B1 | 11/2013 | Vinson et al. |
| 8,599,510 B1 | 12/2013 | Fallone |
| 8,601,248 B2 | 12/2013 | Thorsted |
| 8,611,032 B2 | 12/2013 | Champion et al. |
| 8,612,650 B1 | 12/2013 | Carrie et al. |
| 8,612,706 B1 | 12/2013 | Madril et al. |
| 8,612,798 B1 | 12/2013 | Tsai |
| 8,619,383 B1 | 12/2013 | Jung et al. |
| 8,621,115 B1 | 12/2013 | Bombet et al. |
| 8,621,133 B1 | 12/2013 | Boyle |
| 8,626,463 B2 | 1/2014 | Stevens et al. |
| 8,630,052 B1 | 1/2014 | Jung et al. |
| 8,630,056 B1 | 1/2014 | Ong |
| 8,631,188 B1 | 1/2014 | Heath et al. |
| 8,634,158 B1 | 1/2014 | Chahwan et al. |
| 8,635,412 B1 | 1/2014 | Wilshire |
| 8,640,007 B1 | 1/2014 | Schulze |
| 8,654,619 B1 | 2/2014 | Cheng |
| 8,661,193 B1 | 2/2014 | Cobos et al. |
| 8,667,248 B1 | 3/2014 | Neppalli |
| 8,670,205 B1 | 3/2014 | Malina et al. |
| 8,683,295 B1 | 3/2014 | Syu et al. |
| 8,683,457 B1 | 3/2014 | Hughes et al. |
| 8,687,306 B1 | 4/2014 | Coker et al. |
| 8,693,133 B1 | 4/2014 | Lee et al. |
| 8,694,841 B1 | 4/2014 | Chung et al. |
| 8,699,159 B1 | 4/2014 | Malina |
| 8,699,171 B1 | 4/2014 | Boyle |
| 8,699,172 B1 | 4/2014 | Gunderson et al. |
| 8,699,175 B1 | 4/2014 | Olds et al. |
| 8,699,185 B1 | 4/2014 | Teh et al. |
| 8,700,850 B1 | 4/2014 | Lalouette |
| 8,743,502 B1 | 6/2014 | Bonke et al. |
| 8,749,910 B1 | 6/2014 | Dang et al. |
| 8,751,699 B1 | 6/2014 | Tsai et al. |
| 8,755,141 B1 | 6/2014 | Dang |
| 8,755,143 B2 | 6/2014 | Wilson et al. |
| 8,756,361 B1 | 6/2014 | Carlson et al. |
| 8,756,382 B1 | 6/2014 | Carlson et al. |
| 8,769,593 B1 | 7/2014 | Schwartz et al. |
| 8,773,802 B1 | 7/2014 | Anderson et al. |
| 8,780,478 B1 | 7/2014 | Huynh et al. |
| 8,782,334 B1 | 7/2014 | Boyle et al. |
| 8,793,532 B1 | 7/2014 | Tsai et al. |
| 8,797,669 B1 | 8/2014 | Burton |
| 8,799,977 B1 | 8/2014 | Kapner, III et al. |
| 8,819,375 B1 | 8/2014 | Pruett et al. |
| 8,825,976 B1 | 9/2014 | Jones |
| 8,825,977 B1 | 9/2014 | Syu et al. |
| 2006/0129761 A1 * | 6/2006 | Guha .................. G06F 1/3221 711/114 |
| 2007/0239952 A1 * | 10/2007 | Hwang ............... G06F 11/2058 711/162 |
| 2009/0113702 A1 | 5/2009 | Hogg |
| 2009/0210742 A1 * | 8/2009 | Adarshappanavar ........................ G06F 11/1076 714/6.12 |
| 2010/0306551 A1 | 12/2010 | Meyer et al. |
| 2011/0226729 A1 | 9/2011 | Hogg |
| 2012/0079189 A1 * | 3/2012 | Colgrove ............. G06F 3/0605 711/114 |
| 2012/0159042 A1 | 6/2012 | Lott et al. |
| 2012/0275050 A1 | 11/2012 | Wilson et al. |
| 2012/0281963 A1 | 11/2012 | Krapf et al. |
| 2012/0324980 A1 | 12/2012 | Nguyen et al. |
| 2014/0040702 A1 * | 2/2014 | He ...................... G06F 11/1076 714/766 |
| 2014/0201424 A1 | 7/2014 | Chen et al. |
| 2016/0139991 A1 * | 5/2016 | Miyamae ............ G06F 11/1096 714/6.24 |

OTHER PUBLICATIONS

Bianca Schroeder, et al., "Disk failures in the real world: What does an MTTF of 1,000,000 hours mean to you?", ACM Transactions on Storage, vol. 3 Issue 3, Oct. 2007, pp. 1-16.

Jon Elerath, "Hard-Disk Drives: The Good, the Bad, and the Ugly", Communication of the ACM, vol. 52, No. 6, Jun. 2009, pp. 1-10.

Bingpeng Zhu et al., "Proactive Drive Failure Prediction for Large Scale Storage Systems," Mass Storage Systems and Technologies (MSST), 2013 IEEE 29th Symposium on, May 2013, pp. 1-5.

Eduardo Pinheiro, et al., "Failure Trends in a Large Disk Drive Population," the 5th USENIX Conference on File and Storage Technologies (FAST'07), Feb. 2007, pp. 1-13.

\* cited by examiner

ELECTRONIC SYSTEM WITH DECLUSTERED DATA PROTECTION BY PARITY BASED ON RELIABILITY AND METHOD OF OPERATION THEREOF

TECHNICAL FIELD

An embodiment relates generally to an electronic system, and more particularly to a system with parity coverage of declustered data based on reliability.

BACKGROUND

Modern consumer, cooperate, and industrial users of electronic systems require storage and access to quantities of information from data bases, financial accounts, libraries, catalogs, medical records, retail transactions, electronic mail, calendars, contacts, computations, or any combination thereof. The electronic systems, such as computers, servers, cloud servers, or computer complexes, are key to day-to-day global, social, and economic operations of modern life. It is vital that the quantities of information are protected from loss and provided to the user with reliable and fast access.

To increase and maintain data reliability, a storage system of the electronic systems is used to increase storage reliability, improve data throughput performance, and prevent the loss of the data. Costs and maximum storage utilization of the storage system are also areas of concern for the users/owners of the electronic systems. Economic cycles and system expenditure costs for the users/owners increase or decrease as usage, global market, and economic conditions rise or fall, respectively, so there are growing demands for the storage system to be adjustable to accommodate these cyclic changes.

The users/owners are constantly looking for ways to balance their costs and storage utilization while improving and maintaining the reliability, availability, and performance of data access. Research and development in existing technologies can take a myriad of different directions and often resulting in trade-offs or metric sacrifices. One way to simultaneously increase performance and reduce cost and data loss at the same time is to provide an electronic system product with higher capacity for storage, greater system reliability, increased performance, and improved data protection.

DETAILED DESCRIPTION

Figure 1A:
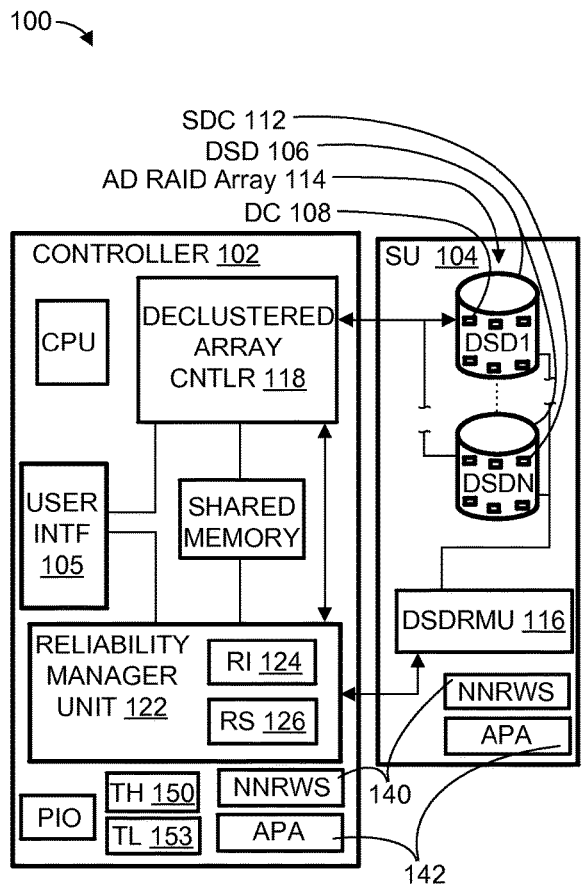
FIGS. 1A and 1B show operational hardware diagrams of an electronic system according to various embodiments.

A need still remains for an electronic system with data loss prevention, increased availability, and improved performance of data access based on system reliability, cost, and storage utilization of a storage system. In view of the ever-increasing commercial competitive pressures, along with growing consumer/industry expectations and the diminishing opportunities for meaningful product differentiation in the marketplace, it is increasingly critical that answers be found to these problems. Additionally, the need to reduce cost, to improve efficiency, reliability, and performance, and to meet competitive pressures adds an even greater urgency to the critical necessity for finding answers to these problems.

Solutions to these problems have been long sought after, but prior developments have not taught or suggested any solutions and, thus, solutions to these problems have long eluded those skilled in the art.

Certain embodiments have other steps or elements in addition to or in place of those mentioned in this application. The steps or elements will become apparent to those skilled in the art from a reading of the following detailed description when taken with reference to the accompanying drawings.

The following embodiments are described in sufficient detail to enable those skilled in the art to make and use the embodiments. It is to be understood that other embodiments would be evident based on the present disclosure, and that system, process, or mechanical changes may be made without departing from the scope of an embodiment.

In the following description, numerous specific details are given to provide a thorough understanding of the embodiments. However, it will be apparent that the embodiments can be practiced without these specific details. In order to avoid obscuring an embodiment, some well-known circuits, system configurations, and process steps are not disclosed in detail.

The drawings showing embodiments of the system are semi-diagrammatic, and not to scale and, particularly, some of the dimensions are for the clarity of presentation and are shown exaggerated in the drawing figures. Similarly, although the views in the drawings for ease of description generally show similar orientations, this depiction in the figures is arbitrary for the most part. Generally, an embodiment can be operated in any orientation.

Figure 1B:
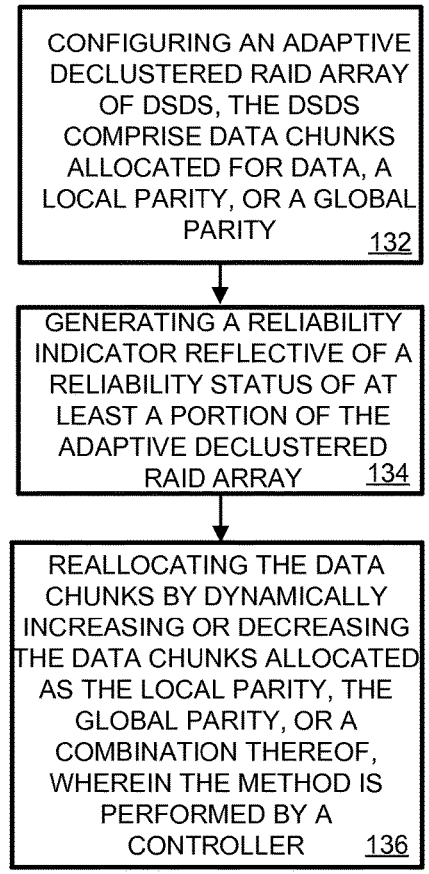

Referring now to FIGS. 1A and 1B, therein are shown operational hardware diagrams of an electronic system 100 according to various embodiments. The electronic system 100 can represent an apparatus for the various embodiments. An embodiment of the electronic system 100 is depicted in FIGS. 1A and 1B and includes a controller 102 coupled to a Storage Unit (SU) 104. The controller 102 can include a processor, a Central Processing Unit (CPU), User Interface (UI) 105, peripheral input/output (PIO) interfaces, and a shared memory.

The CPU, customized based on specific application of the electronic system, can include internal cache, an arithmetic logic unit (ALU), digital signal processor (DSP), firmware controller, interrupt handlers, electro-mechanical servo controllers, or network processors, as examples. The UI 105 can include an interface for keyboards, touch screens, magnetic readers, radio frequency identifiers (RFID), or optical readers, as examples.

The PIO interfaces can include fixed or pre-programmed interfaces for devices such as printers, monitors, audio/visual devices, telecom devices, user defined sensors, electro-mechanical devices, networking devices, or telecom devices, as examples. The host memory can include one or a combination of non-volatile or volatile memory such as a memory device that retains data after power external to the device is removed or a memory device that lose data after power external to the device is removed, respectively.

The Storage Unit 104 has more than one Data Storage Devices (DSDs) 106 that are non-volatile. The DSDs 106 can be random access data storage devices, sequential access data storage devices, or any combination thereof used to store or send user information accessed by the controller 102.

Examples of the sequential access data storage devices can include Tape Drive Devices (TDD) or Optical Storage Devices (OSD). Examples of the random access data storage devices can include Hard Disk Drives (HDD), Solid State Drives (SSD), Solid State Hybrid Drives (SSHD), Bubble Memory Devices (BMD), or Molecular Memory Devices (MMD).

In various embodiments, the Storage Unit 104 can include the DSDs 106 with memory. The memory can be any combination of volatile memory or non-volatile memory for access performance, buffering, or for power loss data retention, respectively.

In various embodiments, the Storage Unit 104 can include an integer number, N, of the DSDs 106, such as DSD1 to DSDN, for example. The DSDs 106 can have different levels of storage efficiency due to overhead. Examples of overhead can include unused storage space fragmentations, space reserved by the controller 102, space reserved by manufacturer reserved, space reserved by the users of the electronic system 100, space reserved for the Storage Unit 104, or any combination thereof.

Total storage capacity of each of the DSDs 106 does not need to be the same with the other DSDs 106. For example, a first DSD can have a capacity of 2 terabytes and a second DSD can have a capacity of 3 terabytes. Each of the DSDs 106 can include a number of Data Chunks (DC) 108 that are individually allocated as a portion of information based on the user information that can include either data, local parity, or global parity.

The terms allocate, allocated, allocation, and allocating define and indicate a dedicated use or purpose of a specified element. For example, the DC 108 allocated as data indicates that the DC 108 is to be used for only for data, until reassigned for another user or purpose. The terms reallocate, reallocated, reallocation, and reallocating define and indicate a change from one dedicated use or purpose of a specified element to a different dedicated use or purpose of the specified element. For example, the DC 108, currently allocated as data can be reallocated as local parity, to change the dedicated use or purpose from only data to only local parity.

The local parity is used to protect and correct the data. The global parity is used to protect the data, the local parity, different global parity, or any combination thereof. Each of the DSDs 106 can also include a number of Spare Data Chunks (SDC) 112. Any of the SDC 112 can be allocated or reallocated into the DC 108, and any of the DC 108 can be allocated or reallocated into the SDC 112. Each of the SDC 112 and each of the DC 108 have identical storage capacities.

The DC 108 can be allocated for information and can be individually further allocated as data, local parity, or global parity, based on reliability metrics, performance expectations, and product requirements, and costs. In an embodiment, at least a first data chunk 108 can be allocated as data, a second data chunk 108 can be allocated as a local parity, a third data chunk 108 can be allocated as a global parity, and a forth data chunk 108 can be allocated as one of the SDC 112, for example.

In another embodiment, one or more of the DC 108 can be reallocated as one or more of the SDC 112. It is understood that any of the DC 108 and the SDC 112 can be allocated or reallocated. In various embodiments, at least one of the DC 108 allocated as data can be reallocated as local parity. Also as an example, at least one of the DC 108 allocated as local parity can be reallocated as global parity. Further as an example, at least one of the DC 108 allocated as global parity can be reallocated as data. Yet further as an example, at least one of the DC 108 allocated as data can be reallocated as global parity. Yet further as an example, at least one of the DC 108 allocated as global parity can be reallocated as local parity. Yet further as an example, at least one of the DC 108 allocated as local parity can be reallocated as data.

In various embodiments, the DC 108 of at least 2 of the DSDs 106 can be used to form any number of Adaptive Declustered (AD) RAID Arrays 114. A Data Storage Device Reliability Manager Unit (DSDRMU) 116 of the Storage Unit 104 is used to extract, record, compile, analyze, and report status of the DSDs 106, the DC 108, the SDC 112, or a combination thereof to the controller 102. The DSDRMU 116 supports configuring the DSDs 106, allocating and reallocation of the DC 108 and the SDC 112, configuring portions of the AD RAID Arrays 114, or any combination thereof.

Although FIG. 1A depicts the electronic system 100 having the controller 102 and the SU 104 as discrete units, it is understood that the controller 102, the SU 104, and functional blocks within either the controller 102 and the SU 104 can be repartitioned and/or regrouped differently. For example, the DSDRMU 116 could be integrated into the controller 102 while the DSDs 106 are located in a separate physical location such as a different city or country. In another example, the controller 102 and the SU 104 could be physically regrouped into a Host system and the DSDs 106 attached to a backplane board within the Host system.

It is also understood that the DSDRMU 116 can be consolidated or distributed in one or more of the DSDs 106. In an embodiment, the DSDRMU 116 can be integrated into one of the DSDs 106, as an example. In another embodiment, all or portions of the DSDRMU 116 could be distributed between 2 or more of the DSDs, as another example. The DSDRMU 116 can operate independent of or in-line with data read/write operations to the user information by the electronic system 100.

In various embodiments, the controller 102 can include a Declustered Array (DA) Controller 118 and a Reliability Manager Unit (RMU) 122. The DA Controller 118 can be dedicated to manage, execute, monitor, and correct the reading and writing of the user information from and to the storage unit. The RMU 122 supervises the DSDRMU 116.

The RMU 122 can extract, record, compile, analyze, report reliability status/information, or a combination thereof of the electronic system 100, the DA Controller 118, each of the AD RAID Arrays 114, and a duplicate copy of all or part of the information compiled by the DSDRMU 116. The information compiled by the DSDRMU 116 can include reliability status/information, months in service, and performance information of the DSDs 106, the DC 108, and the SDC 112.

Circuitry indicating Reliability Indicators (RI) 124 and Reliability Status (RS) 126 in the RMU 122 can be used to compile and consolidate reliability information, performance information, and predictive failure conditions of the DC 108 and the SDC 112. The RMU 122 determines if and which of the AD Raid Arrays 114 require allocation, reallocation, or any combination thereof by evaluating the RI 124, the RS 126, or a combination thereof. The RMU 122 can also perform the evaluation with additional information from the DA Controller 118 or based on input to the controller 102 from users or a higher level system external, such as the PIO or the UI 105. For example, the UI 105 can be used to sending reliability directives to the controller 102 for dynamically increasing or decreasing the data chunks 108 reallocated to local parity, global parity, or any combination thereof.

In various embodiments, the RMU 122 or the controller 102 can dynamically increase or decrease the data chunks 108 allocated as local parity, global parity, or a combination thereof without assists from the DA Controller 118. This increase or decrease can be concurrent with active and pending read/write operations of the user information in the Storage Unit 104. The dynamically increase or decrease of the data chunks 108 is defined as an ability to increase or decrease the data chunks 108 when a condition is detected. In an embodiment the increase or decrease of the data chunks 108 when a condition is detected is performed without authorization, intervention, or assistance from any other elements not specifically indicated.

In an embodiment, the RMU 122 or the controller 102 can dynamically increase or decrease the data chunks 108 when needed and, in certain cases, without any intervention from other elements. In another embodiment, the DSDRMU 116 and the RMU 122 can determine if and which of the DC 108 and SDC 112 need to be increased or decreased, and in certain cases, without any intervention from other elements.

The flow diagram of FIG. 1B shows a method of operating the electronic system 100 in an embodiment. Block shows 132 shows configuring an Adaptive Declustered RAID Array of DSDs, the DSDs comprise data chunks allocated for data, a local parity, or a global parity. Block 134 shows generating a reliability indicator reflective of a reliability status of at least a portion of the Adaptive Declustered RAID Array. Block 136 shows reallocating the data chunks by dynamically increasing or decreasing the data chunks allocated as the local parity, the global parity, or a combination thereof, wherein the method is performed by a controller.

It has been discovered that embodiments provide a flexible and dynamic protection for improved reliability by increasing or decreasing the usage of the DC 108, the SDC 112, or a combination thereof as local parity, the global parity, or a combination thereof. The Adaptive Declustered Raid Arrays 114 including the DSDs 106 and the DSD reliability manager unit 116 along with the reliability manager unit 122 with the RI 124 and the RS 126 provides greater reliability, availability, and through-put than other declustered RAID array systems by preemptively allocating and reallocating the DC 108 and the SDC 112 before read/write operations are impacted for uninterrupted data access and availability.

It has been discovered that the embodiments provide greater reliability, availability, and through-put than other declustered RAID array systems by preemptively allocating and reallocating the DC 108 and the SDC 112 concurrent to active and pending read/write operations. The preemptive allocating, reallocating, or a combination thereof can be accomplished with the Adaptive Declustered Raid Arrays 114 with the DC 108 and the SDC 112, the DSD reliability manager unit 116, and the reliability manager unit 122 with the RI 124 and the RS 126.

It has been discovered that embodiment, such as with the Adaptive Declustered RAID Array 114, provide economical budget constrained usage of different models of the DSDs 106 having a variety of storage efficiencies without compromising system reliability due to self-throttling reliability features provided by dynamic allocation or reallocation of the DSDs 106.

It has been discovered that embodiments with the controller 102, as an example, including the RMU 122, the RI 124, and the RS 126 can be simultaneously connected to different one of the Storage Unit 104 having one of the DSDRMU 116. The controller 102 and the Storage Unit 104 can be geographically separated from one another while providing a robust, secure, reliable Adaptive Declustered RAID Array 114 immune from environments/geological hazard such as earthquakes, floods, subsidence, or similar naturally occurring hazard.

It has been discovered that embodiments provide self-monitoring and analysis of reliability information by the RMU 122 from the RI 124 and the RS 126 to trigger a change in allocation or reallocation local parity and global parity of the DC 108. This allocation or reallocation can increase or decrease the error protection based on wear, age, or infant mortality rates.

It has been discovered that embodiments can provide the controller 102 and the Storage Unit 104 to autonomously allocate and reallocate the SDC 112 and the DC 108 before failure occurs to minimize or eliminate performance and access failures that normally occur during a rebuild of all or portions of the DSDs 106 associated with other declustered RAID array systems. The autonomous allocation and reallocation provide lower cost and higher performing RAID system over the other declustered RAID array systems and other traditional non-clustered RAID array systems.

Figure 2:
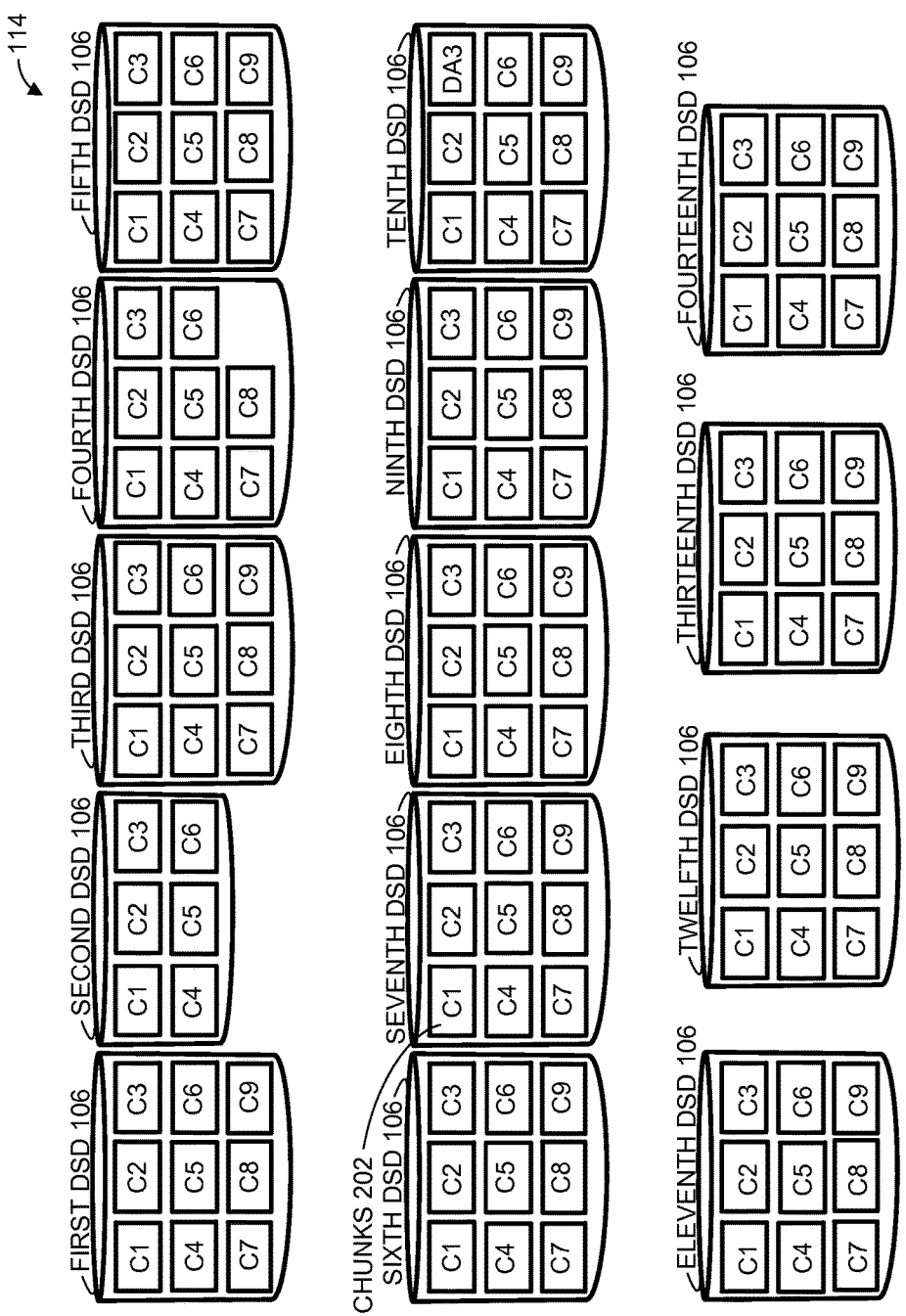
FIG. 2 shows the Data Storage Devices having chunks allocated for the Data Chunks and the Spare Data Chunks to form a first Adaptive Declustered RAID Array according to various embodiments.

Referring now to FIG. 2, therein is shown the DSDs 106 having chunks 202 allocated for the DC 108 and the SDC 112 of FIG. 1A to form a first AD RAID Array 114 according to various embodiments. In an embodiment, each of the DSDs 106 can be divided into the chunks 202 having an identical size and identified by cN, where N equals a whole number used to identify any one of the chunks 202 corresponding to each of the DSDs 106. For example, c1 represents a first chunk, c2 represents a second chunk, c3 represents a third chunk, and etc., of any one of the DSDs 106.

Although the chunks 202 of each of the DSDs 106 are identified and shown in consistent logical positions, it is understood that the each of the chunks 202 can be physically formed from one or more different physical locations. For example, the chunks 202 can be located and identified on different disks, cylinders, sectors, zones, tracks, or any combination thereof, within any one of the DSDs 106.

Various embodiments can include a number for DSDs 106. As an example, FIG. 2 depicts a 1st DSD 106, a 2nd DSD 106, a 3rd DSD 106, a 4th DSD 106, a 5th DSD 106, a 6th DSD 106, a 7th DSD 106, a 8th DSD 106, a 9th DSD 106, a 10th DSD 106, a 11th DSD 106, a 12th DSD 106, a 13th DSD 106, and a 14th DSD 106.

The controller 102 of FIG. 1A and the DSDRMU 116 of FIG. 1A can initially create the chunks 202 to allocate some of the SDC 112 and the DC 108 further allocated as data, local parity, or global parity to form the first configuration for AD RAID Array 114. The allocations of the SDC 112 and the DC 108 can be based on reliability target goals, life cycles, or any combination thereof.

The reliability target goals are provided by users of the electronic system 100 of FIGS. 1A and 1B and can be based on user applications or requirements, such as data criticality, data availability, and client storage cost tradeoffs. Additional details related to the life cycle will be provided below in FIG. 8 and in other embodiments.

As an example, the chunks 202, c1 and c3, of all of the DSDs 106 can initially be allocated by the RMU 122 of FIG. 1A as a first SDC 112 and a second SDC 112, respectively. All of the chunks 202, except for c1 and c3 of all of the DSDs 106, can initially be allocated as the DC 108 by the RMU 122.

C4 of the 1st DSD can be allocated as a first local parity to protect c2 of the 5th DSD and c5 of the 6th DSD. C2 of the 2nd DSD can be allocated as a second local parity to protect c5 of the 7th DSD and the 8th DSD. C6 of the 3rd DSD can be allocated as a third local parity to protect c5 of the 9th DSD and the 10th DSD. C9 of the 6th DSD can be allocated as a fourth local parity to protect c5 of the 11th DSD and the 12th DSD.

C7 of the 14th DSD can be allocated as a first global parity to protect of all the local parities and the data. C8 of the 4th DSD can be allocated as a second global parity to exclusively protect all of the local parities.

In various embodiments, the RMU 122 of FIG. 1A analyzes one or more of the RS 126 of FIG. 1A generated by the RMU 122, received from the DSDRMU 116, or any combination thereof. The RMU 122 generates the RI 124 of FIG. 1A and determines a reallocation or allocation of at least one of the chunks 202 is necessary.

In an embodiment, SDC can be reallocated as another DC for additional local parity when the RMU 122 determines that targeted reliability metrics are not being met. For example, when the RMU 122 has determined from the RI 124 and/or the RS 126 that c5 of the 10th DSD, allocated as data, is not meeting targeted reliability metrics, the RMU 122 can add a fifth local parity to protect the data of c5 of the 10th DSD. The fifth local parity can be formed, for example, by reallocating the second SDC 112, represented by c3 of the 5th DSD, into another of the DC 108 allocated as local parity to protect c5 of the 10th DSD and thus restore the targeted reliability metrics.

In an embodiment, certain DC can be defective and replaced by reallocating other DC/SDC. For example, the RMU 122 can replace a defective c5 of the 10th DSD. The RMU 122 can reallocate the fifth local parity, which is represented by c3 of the 5th DSD, as a replacement for c5 of the 10th DSD.

In an embodiment, certain DC can be allocated as slated for migration and replaced by other DC/SDC. For example, the RMU 122 can reallocate the first SDC 112, which is represented by c1 of the 12th DSD, as another DC 108 for migration of c5 of the 10th DSD. In an embodiment, the RMU 122 can reallocate the first SDC 112, which is represented by c1 of the 12th DSD, as another DC 108 as a data replacement of the c5 of the 10th DSD.

In an embodiment, SDC can be allocated as additional global parity DC. For example, the RMU 122 can reallocate the second SDC 112, which is represented by c3 of the 5th DSD, as a third global parity to protect all of the DC 108 allocated as data, which are shown as c2 of the 5th DSD, c5 of the 6th DSD, the 7th DSD, the 8th DSD, the 9th DSD, the 10th DSD, the 11th DSD, and the 12th DSD.

In various embodiments, global/local parity DC can be allocated as additional SDC when the RMU 122 determines that targeted reliability metrics are being exceeded. For example, when the RMU 122 has determined from the RI 124 and/or the RS 126 that the first AD RAID Array 114 is exceeding targeted reliability metrics, the RMU 122 can reallocate the second global parity, which can be represented by the DC 108 of c8 of the 4th DSD, as another of the SDC 112.

In an embodiment, global parity DC can be allocated as local parity DC, and vice versa. For example, the RMU 122 can reallocate the second global parity, which can be represented by the DC 108 of c8 of the 4th DSD, as a local parity to protect a second AD RAID Array 114 formed with the DC 108 of c8 of the 10th DSD, the 11th DSD, 12th DSD, the 13th DSD, and the 14th DSD allocated as data.

In an embodiment, the RMU 122 can reallocate the second global parity, which can be represented by the DC 108 of c8 of the 4th DSD 106, as a global parity to protect the DC 108 allocated as data and local parity of the second AD RAID Array 114.

It is understood that there can be any number of the DSDs 106 with any number of the DC 108 and the SDC 112 to form one of the AD RAID Arrays 114. In an embodiment, the AD RAID Arrays 114 can be formed from a mixture of different types of DSDs, such as a combination of the HDDs, the SSD, and the MMD, as an example.

In an embodiment, the AD RAID Arrays 114 can be formed from only one DSD 106 with a combined total of some number of the DC 108 and the SDC 112, for an extremely small form factor, high performance, and limited product lifespan application. Some examples for this application can include medical emergencies, rescue emergencies, military usage, and other similar critical, low cost, short lifespan product application, as an example.

In various embodiments the DC 108 with a decreasing RI 124 can be distinguished as either retired, discarded, or dead. When the RI 124 of the DC 108 is less than a high threshold (Th) 150 of FIG. 1A with the data in the DC 108, the DC 108 can still be readable/writable with one retry and/or with a few relocated sectors, and downgraded access performance. In this example, the DC 108 can be marked as retired and will need some low-priority background data migrations, in order to move the data to another of the DC 108. Parts of the DC 108 marked as retired can be reorganized into a different one of the DC 108 or as a new one of the DC 108 with a recalculated RI 124.

If the RI 124 is below a low threshold (T1) 153 of FIG. 1A, the DC 108 has high chance of failure, indicated by multiple retries, with many relocated sectors, accesses requiring the error correction of Low Density Parity Check (LDPC), or any combination thereof.

In this example, the DC 108 are more likely to be replaced and discarded unless there is an access failure to one or more of the DC 108 which results in the DC 108 with the access failure distinguished as dead. If one of the DSDs 106 have numerous retired/discarded chunks, such as exceeding a certain threshold, then the one of the DSDs 106 is likely to be replaced to minimize further impact to the system availability if a replacement is deferred to a later time.

It has been discovered that embodiments can provide the controller 102 with the RMU 122, the RI 124, and the RS 126 along with the DSDRMU 116 to allocate, reallocate, or any combination thereof, chunks 202 of the AD RAID Array 114. This allocation or reallocation can be used to upgrade or downgrade reliability and performance of the electronic system 100 while reducing storage overhead and efficiency, automatically and without any assistance or intervention from outside of the controller 102. This allocation and reallocation can also result in little or no impact to other resources such as circuitry, hardware, software, or any combination thereof, of the electronic system 100 to provide an extremely low cost product.

It has been discovered that embodiments can provide the controller 102 with the RMU 122, the RI 124, and the RS 126 along with the DSDRMU 116 to detect the reliability and performance of chunks 202 of the AD RAID Array 114. This fast detection allows for the AD RAID Array 114 to analyze, determine, and if necessary, execute the allocation, reallocation, or any combination thereof of the chunks 202 to prevent data loss automatically and without any assistance or intervention from outside of the controller 102. Further, the AD RAID Array 114 provides an intelligent storage efficient self-adaptive RAID system based on reliability metrics and performance.

Figure 3:
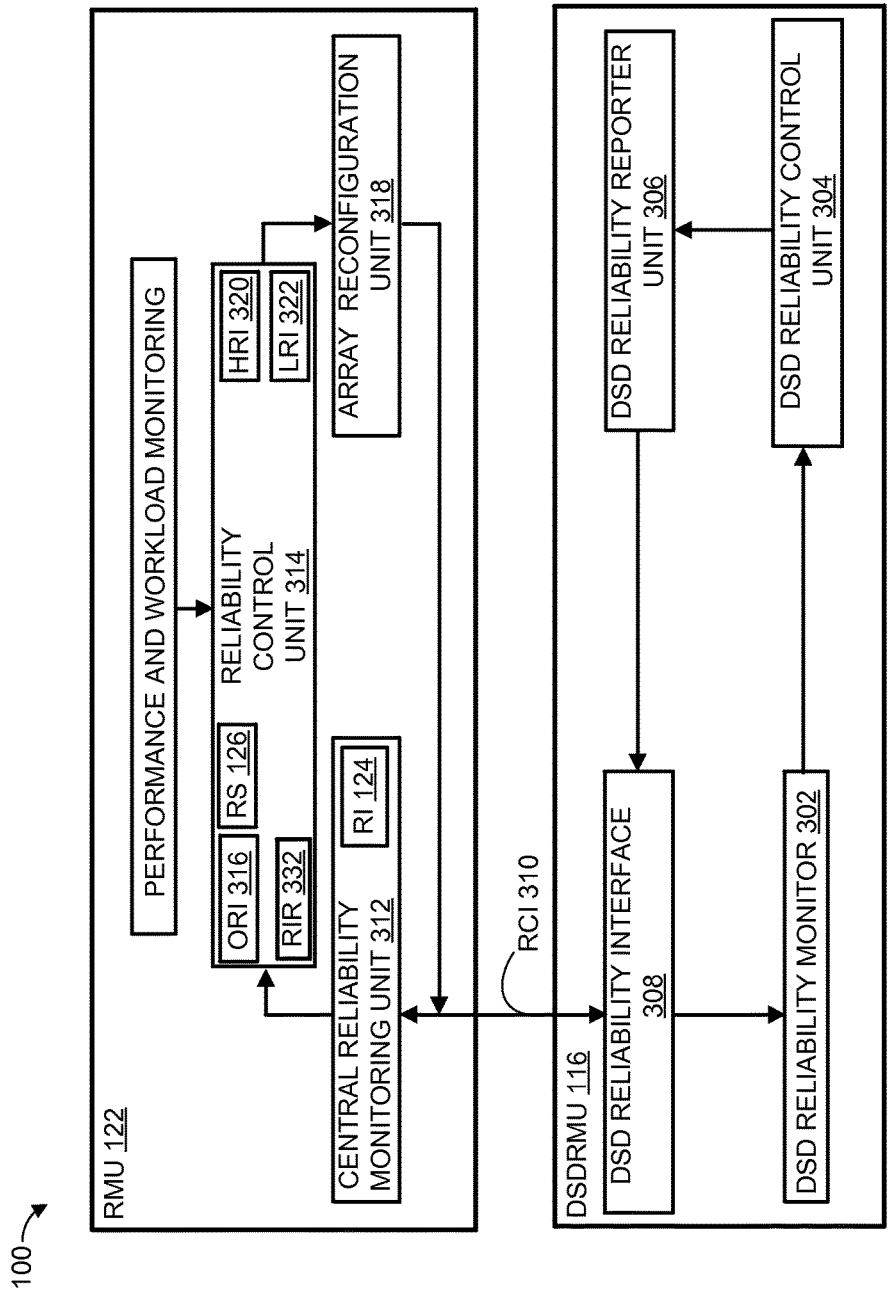
FIG. 3 shows multiple layered reliability monitoring and triggering schemes of the electronic system according to various embodiments.

Referring now to FIG. 3, therein is shown multiple layered reliability monitoring and triggering schemes of the electronic system 100 according to various embodiments. In various embodiments, the DSDRMU 116 and the RMU 122 provide multiple ways to trigger and initialize a reconfiguration procedure of the AD RAID Array 114 of FIG. 1A.

In an embodiment, one way to trigger and initialize the reconfiguration procedure is with a DSD Reliability Monitor (DSDRM) 302 of the DSDRMU 116, coupled to the DSDs 106. The DSDRM 302 can monitor reliability attributes, such as Burst Error Rates (BER) and Error Margins (EM), of the DC 108 of FIG. 1A and the DSDs 106.

A DSD Reliability Control (DSDRC) 304 of the DSDRMU 116 can periodically evaluate the reliability attributes collected by the DSDRM 302 by analyzing and comparing the reliability attributes with on one or more predetermined thresholds. Any of the reliability attributes exceeding the predetermined thresholds can be sent to a DSD Reliability Reporter (DSDRR) 306. As an example, the reliability attributes can include identifying information, such as the DC 108 and the DSDs 106.

The DSDRR 306 can queue up and send the identifying information with the reliability attributes exceeding the predetermined thresholds to a DSD Reliability Interface (DSDRI) 308. The DSDRI 308 manages a Reliability Communication Interface (RCI) 310, such as bidirectional interface separate from any customer data interface, between the DSDRMU 116 and the RMU 122 as a reliability interface for communications between the DSDRMU 116 and the RMU 122. The RCI 310 can be used to transmit the identifying information with the reliability attributes to a Central Reliability Monitoring Unit (CRMU) 312 of the RMU 122.

The CRMU 312 can create the RI 124 and forward the identifying information to a Reliability Control Unit (RCU) 314. The RCU 314 has the capability to access and analyze reliability attributes and status of the SU 104, the DSDs 106, the DC 108, the SDC 112 of FIG. 1A, all of the AD RAID Arrays 114, the RI 124, and any other remote or off-site SU 104. The RCU 314 can generate an Overall Reliability Index (ORI) 316 of the AD RAID Array 114 and other factors such as system workload and performance information associated with the DC 108 and the DSDs 106.

Based on the ORI 316, the other factors, the RS 126 for some of the DC 108, or any combination thereof, the RCU 314 can trigger a reconfiguration of one or more of the AD RAID Arrays 114, one or more of the DC 108, one or more of the SDC 112, or any combination thereof by notifying an Array Reconfiguration Unit (ARU) 318. The other factors can also include user requirements, application requirements, operating costs, or any combination thereof.

The ARU 318 generates configuration information to the CRMU 312, the DSDRI 308, or any combination thereof, to indicate specific reconfiguration operations, when to reconfigure, and where to reconfigure. Examples of where to reconfigure can include one or more of the AD RAID Arrays 114, one or more of the SDC 112, one or more of the DC 108, or any combination thereof.

In another embodiment, the controller 102, a user requirement, or an operator of the electronic system 100 can also trigger and initialize the reconfiguration. For example, a special or unique business need can arise requiring that the ORI 316, the RI 126 of one or more of the DC 108, the RS 126 of one or more of the DC 108, one or more of the AD RAID Arrays 114, or any combination thereof needs to be reconfigured.

In yet another embodiment, the controller 102, the user requirement, or the operator of the electronic system 100 can adapt, adjust, and change the RCU 314 behavior as an indirect way to trigger and initialize the reconfiguration. For example the controller 102, the user requirement, or the operator of the electronic system 100, can temporarily or permanently change the ORI 316, the RS 126, one or more of the predetermined thresholds, or any combination thereof. Temporary or permanent adjustments to one or more of the thresholds are referred to as creating an adaptive threshold.

In various embodiments, the RMU 122 and the DSDRMU 116 can apply a neural network reliability warning scheme (NNRWS) 140 of the controller 102 of FIG. 1A and the SU 104 with reliability metrics to trigger a reconfiguration process based on a reliability warning signal from the DSDs 106. In various embodiments requiring high availability, high performance, and accurate and early preemptive indication to reconfigure the AD RAID Array 114, the controller 102 and the DSDs 106 can apply advanced prediction algorithms (APA) 142 to trigger the reconfiguration process.

In an embodiment, the APA 142 provides superior failure prediction ratios over the simple threshold-based algorithms. The APA 142 is unlike simple threshold-based algorithms such as self-monitoring of reliability factors used to compare against thresholds to signal a warning of near-failure to the controller 102. The APA 142 can be performed by the DSDs 106 and the controller 102. Examples of the APA 142 include neural networks, fuzzy logic models, Bayesian Analytical Approaches (BAA), Support Vector Machine (SVM) learning algorithms, or any combination thereof.

In an embodiment, the controller 102 can apply multi-layered back-propagation neural networks. An example of the three-layered back-propagation neural network can include a fast learning algorithm network first layer to predict a reliability index of chunk, such as the RI 124 of each of the DC 108 of the AD RAID Array 114.

A second layer of a convolutional neural network analyzing the reliability index of chunk of all the other of the DC 108 of the AD RAID Array 114. A third layer, enabling the RCU 314 to calculate a Reliability Index of RAID (RIR)

332, such as Mean Time To Data Loss (MTTDL) or Mean Time To Failure (MTTF) using a layered fuzzy neural network, as examples.

The RIR 332 can be recalculated on pre-determined periodic intervals or on-demand using the RI 124. The RIR 332 can be used to determine if a reconfiguration is required to preempt a probable failure of the AD RAID Array 114. It is understood that the neural network can have any number of layers of the back-propagation. A six-layer back-propagation neural network can be used to further improve the predictive accuracy of pending failure, as an example.

In another embodiment, the controller 102 can initially apply the simple threshold method and three-layer back-propagation neural network to compile, learn, and validate the preferred choice of triggering a reconfiguration. As an example, this triggering can be based on the expectations, usages, and applications for a specific one of the electronic system 100 and to fine tune the triggering analysis and accuracy.

In various embodiments, the RMU 122 can execute the reconfiguration using various different options. The RMU 122 can increase reliability, decrease reliability, prevent a change in reliability from occurring, or any combination thereof.

In an embodiment, at least one of the AD RAID Arrays 114 can be reconfigured to increase reliability by reallocating one or more of the DC 108 or the SDC 112. This reallocation can be to add at least one more local parity, add at least one more global parity, swap to migrate at least one of the DC 108 with another of the DC 108 having a High Reliability Index (HRI) 320, or any combination thereof.

In an embodiment, the HRI 320 is defined to be a reliability rating assigned to specific ones of the DC 108, the SDC 112, the DSDs 106, the AD RAID Arrays 114, or any combination thereof. The HRI 320 is used to indicate superior products in areas of durability, total operating life, burn-in screening, use of military specification components, stress-tests screening, physically protected from environmental/geographical hazards, physically protected by secured/limited access locations, and any combination thereof.

In another embodiment, at least one of the DC 108 can be allocated as a parity or a global parity with a Low Reliability Index (LRI) 322. In this example, this DC 108 can be reallocated as another of the SDC 112 or the DC 108 to decrease excessive reliability or create more available unused resources, respectively, for the AD RAID Array 114 or different one of the AD RAID Array 114. For example, the available unused resources can be reallocated to add at least one more local parity, add at least one more global parity, migrate/swap out and replace at least one of the DC 108 having the LRI 322.

The LRI 322 is defined to be a reliability rating assigned to specific ones of the DC 108, the SDC 112, the DSDs 106, the AD RAID Arrays 114, or any combination thereof. The LRI 322 can be used to indicate average or below average products in areas of durability, total operating life, average or high infant mortality, low/commodity priced components, having attributes opposite to attributes rated having the HRI 320, or any combination thereof.

In yet another embodiment, the controller 102, the user requirement, or the operator of the electronic system 100 can adjust and change the behavior of the RCU 314 as an indirect way to increase or decrease the reliability. For example, the controller 102, the user requirement, or the operator of the electronic system 100, can temporarily, permanently, or any combination thereof, change the Overall Reliability Index ORI 316, the RS 126, one or more of the predetermined thresholds, or any combination thereof, resulting in the reliability increasing or decreasing.

For example, in another embodiment, a newly created AD RAID Array 114 can be initialized having the DC 108 allocated as 10 data, 2 local parity, and 1 global parity representing a virtual RAID grouping of 10+2+1. After a certain time period, if reliability based on the predicted error rate of some of the DC 108 increased or the criticalness of some data is increased, the AD RAID Array 114 can be reconfigured to have 10 data, 2 local parity, and 2 global parity representing a new virtual RAID grouping of 10+2+2.

Continuing with the example, sometime later, the predicated error rate can be decreased because there has been no error event in the virtual grouping. The RMU 122 can reallocate to reclaim one of the 2 global parities and allocate the one of the 2 global parities into one of the SDC 112. So, the RAID grouping is restored back to the original initialized virtual RAID grouping of 10+2+1.

In another embodiment, the newly created AD RAID Array 114, initialized to have a virtual RAID grouping of 10+2+1, can be reconfigured to a higher reliability safety level, such as a virtual RAID grouping of 10+2+3, based on unknown and uncertainty of the newly purchase of the DSDs 106. After reliability baseline operations have been established, the RAID grouping can be reconfigured down to the original initialized virtual RAID grouping of 10+2+1.

It is understood that functional components shown, such as the RMU 122, the DSDRMU 116, the RMU 122, the DSDRMU 116, or any combination thereof, can be partitioned differently. In an embodiment, the entire RMU 122 and parts of the DSDRMU 116 could be integrated together, as an example. In another embodiment, the DSDRI 308 of the DSDRMU 116 could be integrated into the RMU 122, as an example.

It has been discovered that embodiments provide improvements that provide a more reliable, accurate, and early assessment of pending problems to trigger a reconfiguration process before a failure occurs in comparison to simple threshold-based algorithms. These improvements are provided with the use of the APA 142 by the controller 102, the DSDs 106, or any combination thereof to self-monitor, detect, and report a near-failure condition of the DSDs 106, the DC 108, the AD RAID Array 114.

The RIR 332 can be recalculated on pre-determined periodic intervals or on-demand. The RIR 332 can determine if a reconfiguration is required to preempt a probable failure of the AD RAID Array 114. This reconfiguration results in a fast and efficient method to determine and preempt the probable failure to provide superior data availability of the AD RAID Array 114 compared to other clustered or non-clustered RAID array systems.

Figure 4:
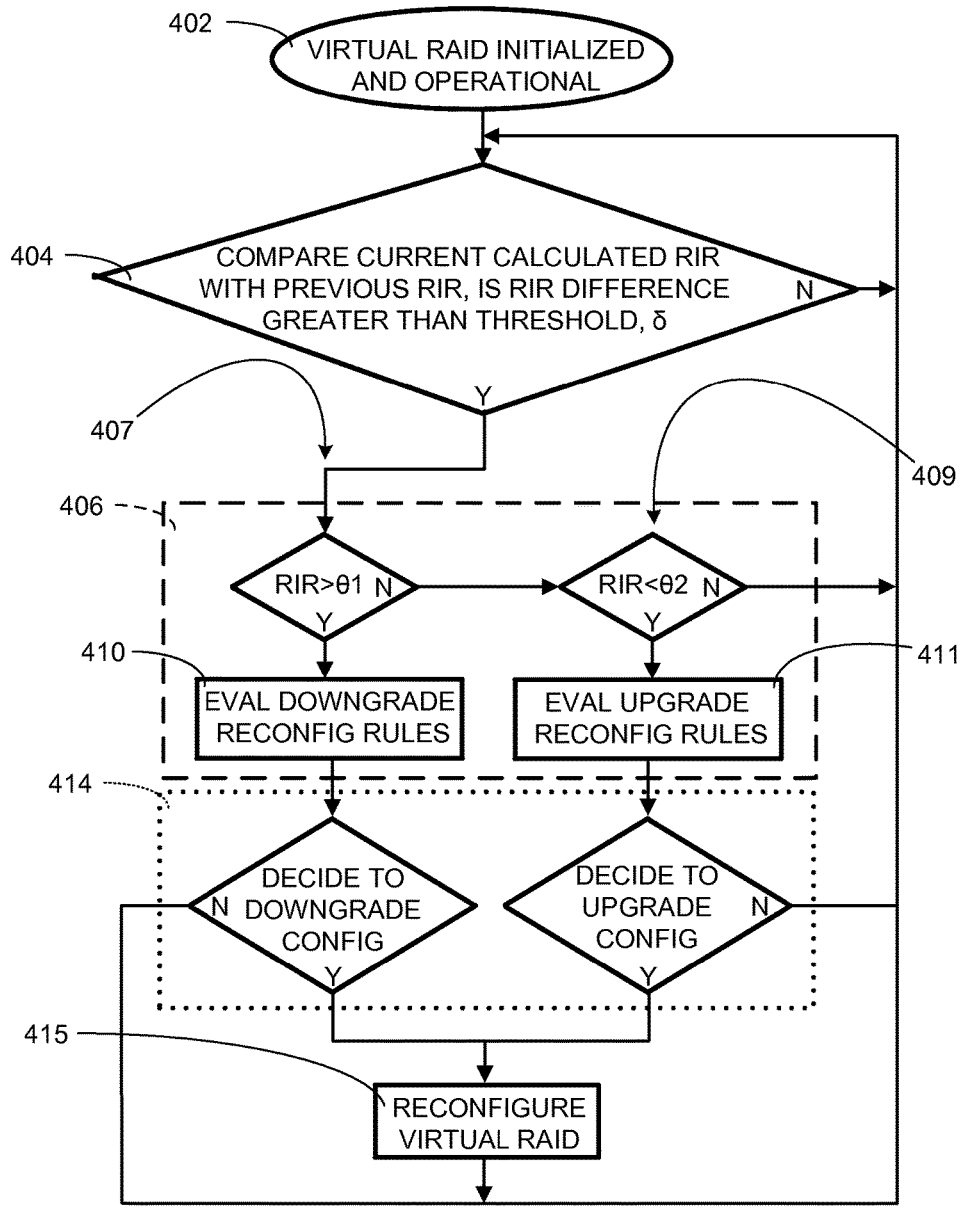
FIG. 4 shows a control flow for continuous self-monitored processing of reliability factors to detect, trigger, and reconfigure the Adaptive Declustered RAID Arrays according to various embodiments.

Referring now to FIG. 4, therein is shown a control flow for continuous self-monitored processing of reliability factors to detect, trigger, and reconfigure the AD RAID Array 114 of FIG. 1A according to various embodiments. An oval 402, labeled as virtual RAID initialized and operational, represents enablement of a self-monitoring process to monitor a virtual RAID, such as the AD RAID Array 114, by the controller 102 of FIG. 1A.

A diamond-box 404, labeled with the phrase staring with "compare current calculated RIR with previous RIR," describes an action to compare consecutive RIRs and determine whether the RIR difference is greater than a predetermined threshold, $\delta$. As an example, the diamond-box 404 represents the controller 102 self-monitoring and periodically sampling the reliability factors of the AD RAID Array 114 over time. The sampling can retrieve the reliability information of the DC 108 of FIG. 1A from the DSDRMU 116 of FIG. 3 using the RCI 310 of FIG. 3.

As an example, the controller 102 calculates the overall reliability factors used to generate the ORI 316 of FIG. 3 and subsequently calculates the RIR 332. A current RIR 332 calculated is compared against a previously calculated RIR, e.g., one that immediately preceded the current RIR calculated. If the difference in change between the RIR 332 calculated and the previously calculated RIR 332 is greater than the predetermined threshold δ (represented by the Y path leading out of the diamond-box 404), then the controller 102 begins to determine if and what type of a reconfiguration is to be performed. Otherwise, the controller 102 can continue to calculate and compare pairs of the RIR 332 (current vs. previous) with the predetermined threshold δ, as represented by the N path leading out of the diamond-box 404.

A dashed-box 406, contains a reconfiguration process used by the controller 102 to determine if and what type of the reconfiguration is to be performed. The reconfiguration type 406 includes a downgrade type 407 and an upgrade type 409.

In the downgrade type 407, the RIR 332 is compared against first predefined reliability threshold, θ1, to determine if the AD RAID Array 114 has a configured reliability that is much more reliable than needed. In the upgrade type 409, the RIR 332 is compared to a second predefined reliability threshold, θ2, to determine if the AD RAID Array 114 has a configured reliability that is in need of a more reliable configuration.

The RIR 332 greater than θ1 indicates that all of the DC 108 and the DSDs 106 of the AD RAID Array 114 exceeds the storage reliability needed for the electronic system 100 of FIG. 1A. This RIR 332 condition can indicate that the resources, such as the DSDs 106, DC 108, or combination thereof, are not being efficiently used and parity protection should be downgraded to free up DC for data storage use, e.g., for use by another AD RAID Array 114 as previously described in FIG. 2.

The RIR 332 less than θ2 can indicate that the AD RAID Array 114 is in need of a reliability upgrade to meet the requirements of the electronic system 100 and parity protection may need to be upgraded (and/or other reliability enhancing measures such as data refresh or migration) as previously described in FIG. 2. The RIR 332 equal or greater than θ2 and equal or less than θ1, indicates that the storage reliability is currently within the requirement range of the electronic system 100 and should be continued to be monitored in the diamond-box 404, with no upgrade or downgrade reconfiguration action needed.

As indicated in the dashed-box 406, a decision to downgrade or upgrade is determined by evaluation of downgrade reconfiguration rules 410 or evaluation of upgrade reconfiguration rules 411, respectively. The upgrade and the downgrade rules can be based on rules used by the controller 102, the SU 104 of FIG. 1A, users/owners of the electronic system 100, or any combination thereof.

The upgrade and the downgrade rules can include the rules applied in and with the analysis and computations from a system user or an operator of the electronic system 100, the DSDRMU 116, the RMU 122, the RI 124, the RS 126, the BER, the EM, the APA 142, the multi-layered back-propagation neural networks, the MTTLD, the MTTF, the RIR 332, the HRI 320, the LRI 322, the ORI 316, the predetermined thresholds δ, the predefined reliability thresholds θ1 and θ2, as examples.

A dotted-box 414, shows a layer of decisions boxes used to make a final determination if the downgrade or upgrade needs to be performed immediately or deferred. The decisions can be based on criticality of the data, customer requirement, applications being performed, time of use, or any combination thereof.

In an embodiment, a decision to defer the reconfiguration can be a result of the AD RAID Array 114 having a light workload or an unavailability of the RCI 310 process reconfiguration of the AD RAID Array 114 due to priority communications with a different AD RAID Array 114 perform reconfigurations to the different AD RAID Array 114. The light workload can be attributed to being offline, being idle, or being phased-out. If no deferral is decided, then the reconfiguration proceeds in box 415. In either case, whether the reconfiguration takes place or is deferred, the process returns to box 404 where monitoring continues.

In another embodiment, a decision to immediate reconfigure could be necessary to free up some of the clusters by reallocating some of the DC 108 as the SDC 112 for use in another one of the AD RAID Array 114. In another embodiment, a decision to immediately reconfigure could be to replace one of the DC 108 having critical information approaching failure with another DC 108 or one of the SDC 112. In an embodiment, the decision to defer or immediately reconfigure can be directed with the use of adaptive thresholds described in FIG. 3.

It is understood that whether a reconfiguration is triggered based on a current RIR 332 value, user requirement, or any combination thereof, the actual trigger rule a simple threshold method with or without a neural networks to intelligent formulations using heuristic methodologies. The reconfiguration start depends on many factors such as the data criticalness, system workload, performance, or any combination thereof.

In various embodiments where other types of storage media, such as SSDs, the concepts, processes, and methods described for the electronic system 100 in FIG. 1A, FIG. 1B, FIG. 2, FIG. 3, and FIG. 4 can also apply. For example, each of the SSD records a wearing value that can be used by the controller 102 to determine indicators similar to the RI 124, the RS 126, and the ORI 316 for reliability metrics of the SSD data chunks.

It has been discovered that the architected and use of the predetermined threshold, δ, the predefined reliability threshold, θ1, the predefined reliability threshold, θ2, or any combination thereof by the DSDRMU 116 of the AD RAID Array 114 provides a method to quickly modify the reliability and performance of the AD RAID Array 114 by simply modifying any combination of the predetermined threshold, δ, the predefined reliability threshold, θ1, or the predefined reliability threshold, θ2 without the need of long complex calculations and analysis.

Figure 5:
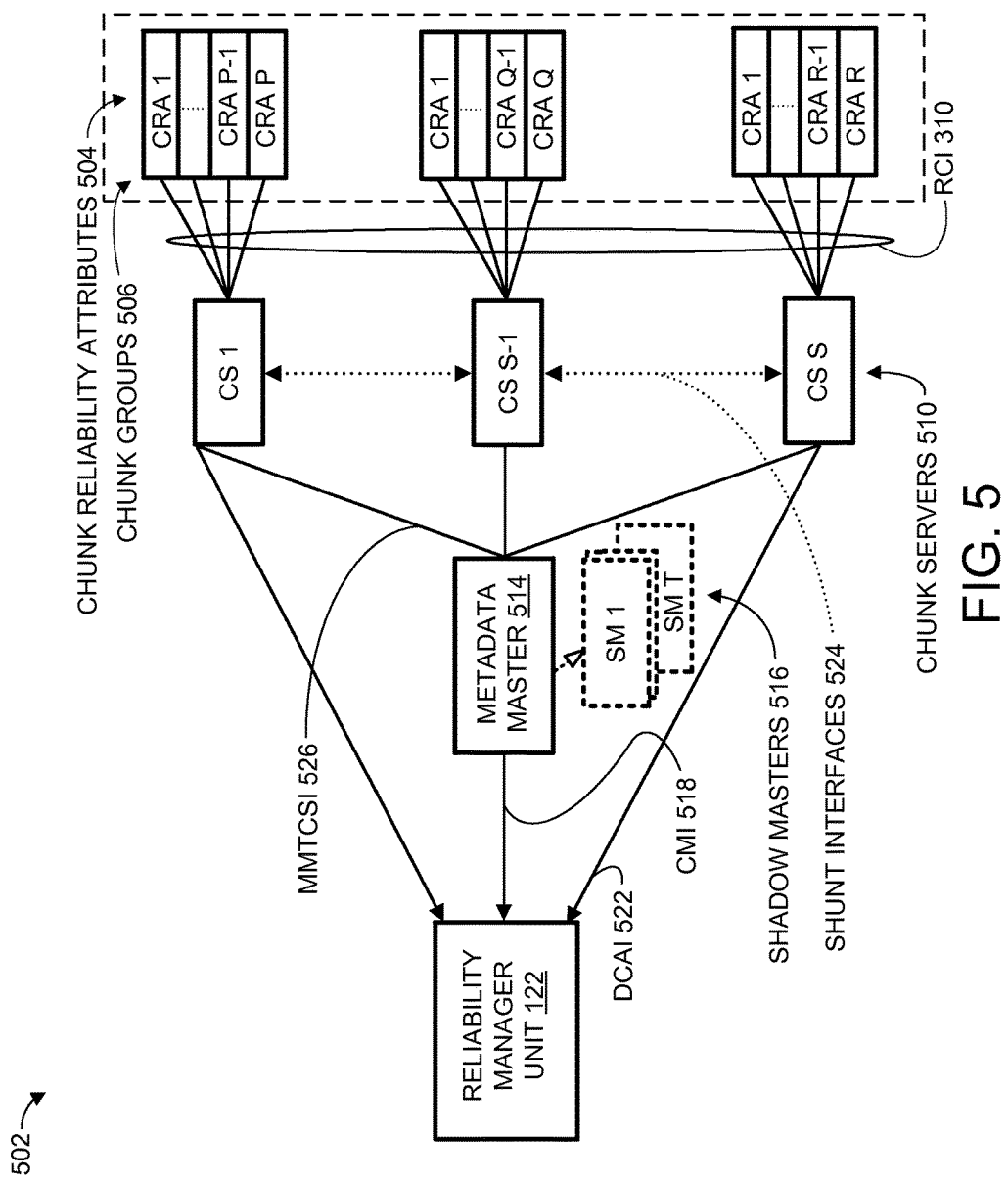
FIG. 5 shows Multiple Attribute Reliability and Metadata Interfaces of the electronic system coupling the controller with the Data Storage Devices of the Storage Unit according to various embodiments.

Referring now to FIG. 5, therein is shown Multiple Attribute Reliability and Metadata Interfaces (MARMI) 502 of the electronic system 100 of FIG. 1A coupling the controller 102 of FIG. 1A with the DSDs 106 of FIG. 1A of the SU 104 of FIG. 1A according to various embodiments. In an embodiment, the MARMI 502 can include Chunk Reliability Attributes (CRA) 504 forming one or more Chunk Groups (CG) 506, one or more Chunk Servers (CS) 510, a Metadata Master (MM) 514, optional Shadow Masters (SM) 516, and the RMU 122 of FIG. 1A.

The Chunk Reliability Attributes (CRA) 504, shown in a dashed-box, can include Data Error Rates (DER), the EM, the BER, recoverable errors, non-recoverable errors, storage performance and efficiency ratings, the RI 124 of FIG. 1A and the RS 126 of FIG. 1A of each of the DC 108 of FIG. 1A and the SDC 112 of FIG. 1A, or any combination thereof of the DSDs 106 of FIG. 1A.

The CRA 504, with the reliability attributes of the chunks 202 of FIG. 2, can be used to calculate the RIR 332, previously described in FIGS. 3 and 4. The CRA 504 can be entries in memory from circuitry, software, or any combination thereof. The CRA 504 can be organized in any number of the CG 506. For example, a first CG 506 can have 1 to P entries, a second CG 506 can have 1 to Q entries, and a third CG 506 can have 1 to R entries of the CRA 504, where P, Q, and R can be any integer value. The MM 514 provides the chunk mapping information for any of the AD RAID Arrays 114 of FIG. 1A to the RMU 122 using a Chunk Map Interface (CMI) 518.

Each of the CG 506 is directly connected to one of many of the CS 510, such as a CS 1 to CS S, where S can be any integer value. The RMU 122 can communicate directly with the CS 510 to obtain the CRA 504 using a Direct Chunk Access Interface (DCAI) 522 and shunt interfaces 524, shown with dotted-lines. The CRA 504 can be processed by each of the CS 510 and viewed by the MM 514, using Metadata Master To Chunk Server Interfaces (MMTCSI) 526, as another type of metadata and can be stored as metadata in the MM 514 of the controller 102 for use by the RMU 122 through the CMI 518.

In an embodiment the RCI 310 of FIG. 3 can be used to connect the CS 510 with the CG 506. The optional Shadow Masters (SM) 516, numbered from 1 to T, where T is any integer number, can be included in the controller 102, directly connected to the MM 514, to augment and off-load management and mapping tasks of the MM 514, by reducing the number of the CS 510 managed by the MM 514. The CS 510 also off-loads the MM 514 by managing, pre-processing, and channeling the CRA 504 to separate MMTCSI 526 for simplified mapping by the MM 514.

The MMTCSI 526 send trigger warning/alarm signals, from the DSDs 106 to the controller 102, that are associated with one or more of the CRA 504 when one or more of the CRA 504 does not satisfy the predefined reliability thresholds, predefined requirements, predefined constant values, predetermined thresholds, or any combination thereof.

It is understood that functional components shown, such as the RMU 122, for example, can be integrated differently. For example, in a small scaled electronic system 100, the functionality of RMU 122 could be integrated with one or more of the CS 510 and eliminate or absorb some functions of the MM 514.

In various embodiments, the DCAI 522, the CMI 518, the shunt interface, the MMTCSI 526, and the RCI 310 can operate with a common connection and communication infrastructure, such as an interface with Vendor Specific Commands (VSC) or other specific Application Programming Interface (API), as examples. The CRA 504 can be stored in the controller 102, the SU 104, or any combination thereof.

In an embodiment, the CRA 504 can be also classified as a type of metadata, hence, the CRA 504 can be directly stored or reside in the MM 514. In an embodiment, the CS 510 reduces the workload of MM 514 by distributing the CRA 504 information to the CS 510 for further distribution to the MM 514 and the RMU 122. The MMTCSI 526 enables the RMU 122 to directly monitor the RIR 332 of FIG. 3 and calculate, evaluate, and adjust the RIR 332 under different situations, for example.

In various embodiments, the MARMI 502 can include the fuzzy logic, the neural networks, the SVM, or other advanced prediction or learning algorithms to predict and compensate for changes, as described in FIG. 3. The MARMI 502 can also provide the reliability-related raw data/attributes, such as the EM (error margin) or the BER (bit error rate) associated with the DC 108 and/or the DSDs 106 to the controller 102 when requested, such as for user review, validation of reliability target metrics, or periodic performance monitoring of the electronic system 100.

In various embodiments, the MARMI 502 can store chunk size information used to create the chunks 202 in a normal operating mode, an advanced operating mode, or any combination thereof. In the normal operating mode, the DSDs 106 can only store and process a few limited historical reliability data information without the intervention from the controller 102. In the normal operating mode, the DSDs 106 can store information for each head, such as on record per data zone/head or even one record per head resulting in storing 240 records or 4 records, respectively, assuming there are 4 heads and 60 data zones, as an example, for creating the chunks 202.

In the advanced operating mode, the MARMI 502 can provide the chunk size information to the DSDs 106. The DSDs 106 will try to allocate continuous tracks within one surface of a disk into a single one of the DC 108. The DSDs 106 can decide the granularity to store the records based on some parameters of the DSDs 106 such as the DSDs 106 local, external cache, or combination thereof cache size based on the configuration of the MARMI 502.

For example, one of the DSDs 106, can be a 4 TB drive with a 64 MB chunk size and 65536 chunks, can select a granularity of 16 and group approximately 16 contiguous chunks on the same disk surface into one record, so that only 4096 records are required. The MARMI 502 can be used to configure the granularity or grain size based on predetermined or user settings.

As an example, the advanced operating mode provides much more chunk formatting efficiency and storage utilization accuracy, than the normal operating mode, and requires additional memory space, background capability, and computational power provided by the MARMI 502. The MARMI 502 can also store the records in a dedicated space such as a cache within the controller 102, a cache of the CPU of FIG. 1A, the shared memory of FIG. 1A, or any combination thereof. The additional memory space can be used to store other attributes such as a chunk access count, access temperature, workload/utilization history, or any combination thereof. Each of the records can have an associated time-stamp or valid period (time-window). When any of the records become invalid, the MARMI 502 must issue a request to update the value.

In the normal operating mode, during initialization of the DSDs 106, the DSDs 106 chooses a few places on each disk surface to get data, such as once per data zone per head, for example. In the advanced operating mode, more records are required and initially the DSDs 106 can use the data zone's value or head's value, to avoid too many background accesses before accessing the additional memory space.

There can be two types of record accesses/updates. The first type of the record access/update is passive access and occurs when one of the DSDs 106 is accessing a region having both user data and the record, such as a user, customer, or application reading/writing to user data on tracks that also include the record near or adjacent the user data.

The second type of the record access/update is active access and occurs by either explicit access or automatic triggered access of the record, by the MARMI 502. In embodiments, the MARMI 502 can explicitly access specific locations on tracks and access or update the record as needed, as an example.

In other embodiments, the MARMI 502 can set a periodically access, at a predetermined sampling frequency, for explicit locations on the tracks to access or update the record as needed, as another example. Configuration reliability downgrades, such as a reallocation of one or more of the DC 108 to another of the SDC 112 is usually performed using the active access type of record update unless there is a need for deep reformatting/reconfigurations, such that the record is initialized again.

The MARMI 502 can monitor online, the reliability attributes of the AD RAID Arrays 114 and dynamically reconfigure any of the AD RAID Arrays 114 without interrupting service or operation of the SU 104, in order to maintain the MTTDL at an acceptable level across life cycles of the DSDs 106 in the electronic system 100, this is further described in FIG. 8, below.

The RI 124 of FIG. 1A can be updated in the active mode, passive mode, or any combination thereof. In the passive mode, once an access happens to one of the DC 108, the reliability information corresponding to the one of the DC 108 can be obtained from the DSD 106 by having the controller 102 access reliability raw data of the one of the DC 108 to calculate the RI 124 based on the reliability raw data. In active mode, a sampling frequency is set, and the RI 124 is updated after calculation at least once a sampling time window.

In various embodiments, record updates such as the update of the RI 124 when a user IO command in the controller 102 enters the DSDs 106, the DSDs 106 can get the corresponding reliability information of the command's access regions, such as the DC 108, at the same time, and then feedback it to the controller 102. Other times when there is no IO command in the controller 102, the controller 102 can independently trigger a reliability request to drive, if necessary.

The independently trigger of a reliability request by the controller 102 is usually a background task and can be submitted independent of IO activity or in line between the user IO commands by assigning/adjusting a task priority level of the reliability request according to different activities/situations. The system can also set a sampling period to update the record in either the controller 102 side or the DSDs 106 side. If within the sampling period, there is a user IO command, then the record is updated; otherwise, a background command should be issued to get the record.

The process to initialize a record in the controller 102 side includes setting the MARMI 502 operating mode to either normal operating mode or an advanced operating mode in the user's configuration settings, setting the MARMI 502 record access type to either active access or passive access, and obtaining reliability raw data of each of the DC 108 from the DSDs 106.

The process to initialize a record in the DSDs 106 side includes setting the MARIMI 502 operating mode to either normal operating mode or an advanced operating mode in the controller configuration settings. This process to initialize the record in the DSDs 106 can also include determining a record number from the controller 102 and the DSDs 106 configuration, setting the record access type to either active access or passive access, and reading/writing particular places in the DSDs 106 to obtain and record reliability-related raw data.

It has been discovered that the combination of the DCAI 522 and the shunt interfaces 524 interconnecting the CS 510 with one another provides fast communication paths between each of the CS 510 to minimize access latency between to any one of the CG 506 and any one of the CS 510. The fast communication paths result in fast and early preemptive detection of reliability issues with an AD RAID Array 114 before failures occur. The early preemptive detection can result in fast and expedient actions such as allocation, reallocation, or any combination thereof of any of the DC 108 associated with the AD RAID Array 114.

It has been discovered that the MARMI 502 provides the RMU 122 with the ability to quickly access the RIR 332 calculations, the chunk mapping of the CRA 504, and the chunk mapping of the AD RAID Arrays 114 to adjust for different reliability situations. Adjusting for the different reliability situations enables optimum configuration, reconfiguration, allocations, reallocations, or any combination thereof for any of the AD RAID Arrays 114 to provide extremely efficient adjustments to the AD RAID Arrays 114.

It has been discovered that additional memory space, background analysis capability, and computational power of the MARMI 502 improves the advanced operating mode to substantially increase chunk formatting efficiency and storage utilization of the DSDs 106 than the normal operating mode and other declustered RAID arrays.

It has been discovered that the MARMI 502 formed of the RMU 122, the MM 514, the CS 510, and the CG 506 of CRA 504 provides the controller 102 the capability to monitor the reliability attributes of the DSDs 106 and reconfigure AD RAID Array 114 without interrupting RAID service resulting in a maintained acceptable MTTDL, system performance, and system reliability.

It has been discovered that the DCAI 522, the CMI 518, the MMTCSI 526, and the shunt interfaces 524 can be similar or identical as the RCI 310 to provide a common connection and communication infrastructure using a single set of VSCs or APIs. The common connection and communication infrastructure results in cost savings, savings in circuitry, and substantially reduced time to market due to shortened development and time-to-market.

It has been discovered that the reliability index of RAID (RIR), including the MTTDL and the MTTF, can be quickly calculated from the CRA 504 to enable fast trade-off analysis using the APA 142 of RMU 122 for fast conversion and therefore faster preemptive actions such as reconfigurations upgrades, downgrades, or any combination thereof.

Figure 6A:
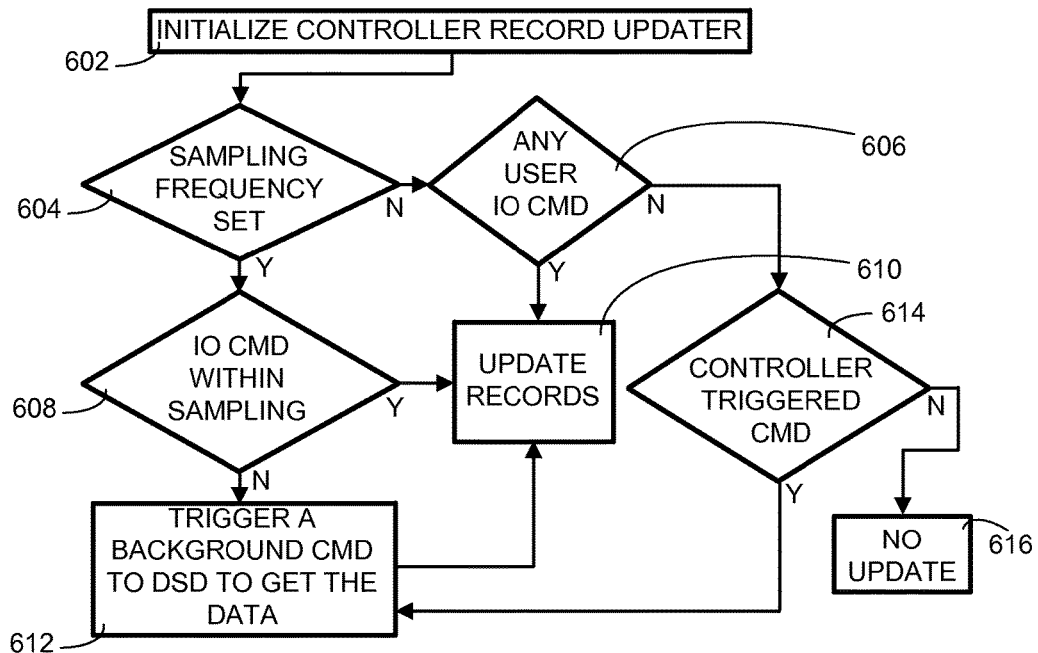
FIGS. 6A and 6B show flow charts of record updating by the controller using an optional sampling frequency feature and record updating by the Data Storage Devices according to various embodiments.
Figure 6B:
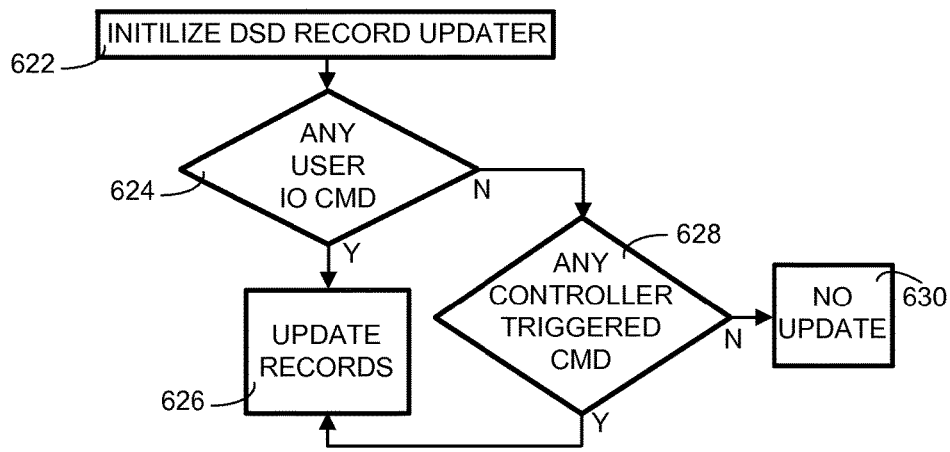

Referring now to FIGS. 6A and 6B, therein are shown flow charts of record updating by the controller 102 of FIG. 1A using an optional sampling frequency feature and record updating by the DSDs 106 of FIG. 1A according to various embodiments.

FIG. 6A shows a flow chart of an optional sampling frequency feature to actively update records, according to various embodiments. As an example, shown are the process/decision blocks within the controller 102 that can be individually performed, processed, and executed with firmware, hardware, or any combination thereof.

Shown is a block 602, labeled as initialize controller record updater, representing initiation procedures that occur on power-up or reset. As an example, block 602 can include actions to perform a power-up initiation procedure of the controller 102 of FIG. 1A, including initialization of the RMU 122 of FIG. 3. In this example, the initialization can include initializing default options, parameters, initial records, and settings including the process to initialize the record in the controller, described in various embodiments.

Block 604 labeled as sampling frequency set, can follow block 602 and can represent a decision launching block to determine if the optional sampling feature to update records is enabled or disabled, before branching to a path for No or a path for Yes. The optional sampling feature can be enabled/disabled during the initiation procedures of block 602, or changed at any time by the controller 102 or user/operator intervention.

In block 604, if the optional sampling feature is determined to be disabled, then the path labeled with N is taken, otherwise path labeled with Y is taken. The path Y of block 604 leads to block 608, labeled as IO command within sampling, representing the enablement of the optional sampling feature. Block 608 can be an action to wait and monitor for either an IO command or a sample trigger event without any IO command. The sample trigger event indicates that records should be updated to ensure that the records are current, and not stale from extended periods of no IO commands.

When an IO command is detected in block 608, path Y is taken to block 610, labeled as update records. Block 610 represents the updating of records with IO data associated with the IO command. The IO data can, for example, include physical attributes and associated information such as reliability, status, performance, or exception information. After the records are updated, block 610 can branch back to block 604 (branch back not shown for simplicity of presentation) and the process flow can be resumed/restarted at block 604.

Returning back to block 608, if the sample trigger event is detected without any IO command in block 608, then path N is taken to block 612, labeled as trigger a background command to the DSD 106 to get the data. Block 612 represents the autonomous generation of at least one background command that includes the reading of the IO data from one or more of the DSDs 106 before branching to the process/decision block 610. Records are updated in block 610, before a branch back to block 604 occurs to resume/restart the process flow.

Returning back to block 604, if an IO command is detected in block 604, then irrespective of any sample trigger event, path N to block 606 is taken. Block 606, labeled as any user IO command, can represent a decision to evaluate/determine if the IO command is a user IO command directed to at least one of the DSDs 106 or a non-user IO command. If a user IO command is detected in block 606, then path Y is taken to block 610 to update the records. After the records are updated, block 610 branches back to block 604 (branch back not shown for simplicity of presentation) to resume/restart the process flow.

Returning back to block 606, if a non-user command is detected in block 606, then path N is taken to block 614, labeled as controller triggered command. Block 614 represents a decision process to determine if the non-user command is a controller command or a non-controller command. If the command is determined to be a controller command in block 614, then path Y is taken to block 612 to first autonomously generate the background command to read the IO data, followed by a branch to block 610 to update the records, and subsequently branch back to block 604 to resume/restart the process flow.

Returning back to block 614, if the non-user command is determined to not be a controller command in block 614, then path N to block 616 is taken. Block 616, labeled as no update, represents a decision to not update any of the records and to branch back to block 604 to resume/restart the process flow.

FIG. 6B shows a flow chart of record updating by the DSDs 106 without an optional sampling frequency feature, according to various embodiments. As an example, shown are the process/decision blocks within the DSDs 106 that can be individually performed, processed, and executed with firmware, hardware, or any combination thereof.

Shown is a block 622, labeled as initialize DSD record updater, representing initiation procedures that occur on power-up or reset. As an example, block 602 can include a power-up initiation procedure of the each of the DSDs 106 and initialization of the DSDRMU 116 of FIG. 3.

Block 624, labeled as any user IO command, follows block 622 after initiation procedures have completed and represents a decision launching action to wait until either a user IO command or a non-user command is detected. If a user IO command is detected in block 624, path Y is taken to block 626 to update records of the DSDs 106. After the records have been updated in block 626, the controller 102 is notified that records of the DSDs 106 have been updated before block 626 branches back to block 624 (branch back not shown for simplicity of presentation) to resume/restart the process flow.

Returning back to block 624, if a non-user command is detected in block 624, then path N to block 628 is taken. Block 628, labeled as any controller triggered command, is a decision block to determine if the non-user command is a controller command or a non-controller command. If it is determined in block 628 that the non-user command is a controller command, then path Y is taken to block 626.

The controller command can be a background command from block 612 of FIG. 6A, for example. In block 626 the controller command is executed and the records of the DSDs 106 are updated before the controller 102 is notified that the records have been updated. After the controller 102 is notified that the update has completed, block 626 branches back to block 624 (branch back not shown for simplicity of presentation) to resume/restart the process flow.

Returning back to block 628, if the non-user controller command is a non-controller command, then branch to path N to block 630, labeled as, no update. Block 630 represents a decision block to not update any of the records in the DSDs 106 and branch back to block 624 to resume/restart the process flow.

It has been discovered that the RMU 122 and the controller 102 with the optional sampling frequency feature, combined with the DSDRMU 116, optimizes the triggering and decision processing of record updating by forming a self-managed two-leveled parallel architecture that results in an autonomous, fast, efficient, and low overhead record updating management process.

Figure 7A:
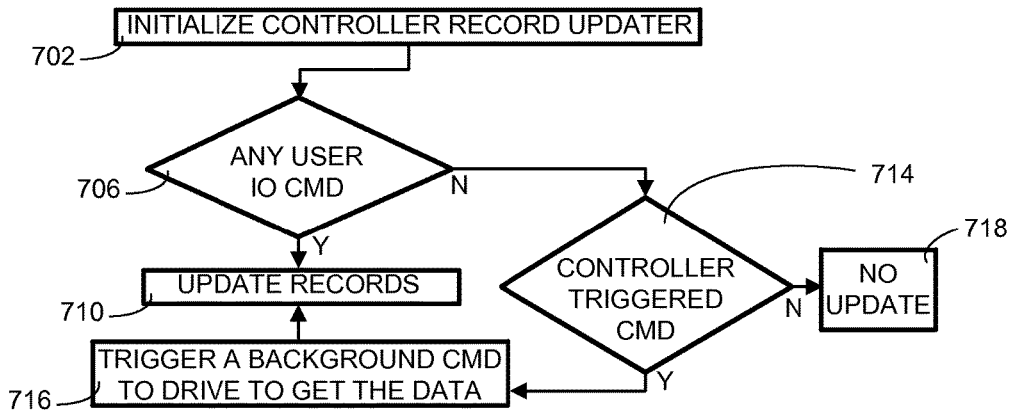
FIGS. 7A and 7B show flow charts of record updating by the controller and record updating by the Data Storage Devices using an optional sampling frequency feature according to various embodiments.
Figure 7B:
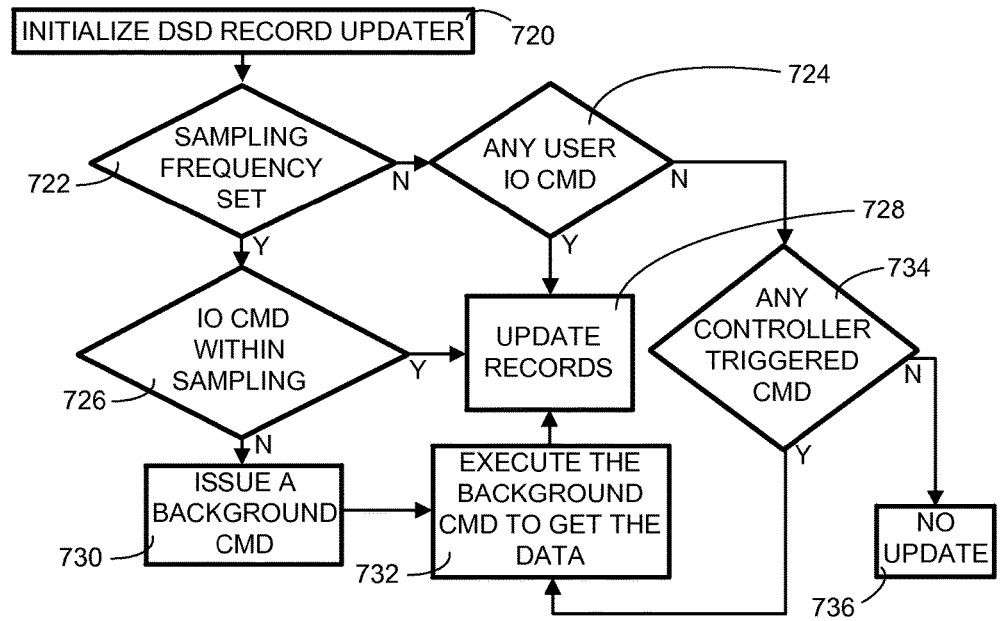

Referring now to FIGS. 7A and 7B, therein are shown flow charts of record updating by the controller 102 of FIG. 1A and record updating by the DSDs 106 of FIG. 1A using an optional sampling frequency feature according to various embodiments.

FIG. 7A shows a flow chart of record updating by the controller 102 without an optional sampling frequency feature, according to various embodiments. As an example, shown are the process/decision blocks within the controller 102 that can be individually performed, processed, and executed with firmware, hardware, or any combination thereof.

Shown is a block 702, labeled as initialize controller record updater, representing initiation procedures that occur on power-up or reset. As an example, block 702 can include actions to perform a power-up initiation procedure of the controller 102 of FIG. 1A, including initialization of the RMU 122 of FIG. 3. In this example, the initialization can include initializing default options, parameters, initial records, and settings including the process to initialize the record in the controller, described in various embodiments.

After the intuition procedure has completed, block 706 is entered. Block 706, labeled as any user IO command, is a decision launching action to wait for either any user IO command or a non-user command. If a user IO command is detected in block 706, then path Y is taken to block 710, labeled as update records. In block 710, the records are updated before branching back to block 604 (branch back not shown for simplicity of presentation) to resume/restart the process flow.

Returning back to block 706, if a non-user command is detected in block 706, path N is taken to block 714, labeled as controller triggered command. In block 714 a decision process is used to determine if the non-user command is either a controller triggered command or a non-controller triggered command. If the non-user command is determined in block 714 to be a controller triggered command, path Y is taken to block 716, labeled as trigger a background command to drive to get the data.

Block 716 represents the autonomous generation of at least one background command that includes the reading of the IO data from one or more of the DSDs 106 before branching to block 710 to update the records, and subsequently branching back to block 706 (branch back not shown for simplicity of presentation) to resume/restart the process flow.

Returning back to block 714, if the non-user command is determined to not a controller command in block 714, path N to block 718 is taken. Block 718, labeled as no update, represents a decision to not update any of the records and to branch back to block 706 to resume/restart the process flow.

FIG. 7B shows a flow chart of record updating by the DSDs 106 with an optional sampling frequency feature, according to various embodiments. Shown are the process/decision blocks within the DSDs 106 that can be individually performed, processed, and executed with firmware, hardware, or any combination thereof.

Shown is a block 720, labeled as initialize DSD record updater, representing initiation procedures that occur on power-up or reset. As an example, block 720 can include a power-up initiation procedure of the each of the DSDs 106 and initialization of the DSDRMU 116 of FIG. 3.

Block 722, labeled as sampling frequency set, follows block 720 and represents a decision launching action to determine if the optional sampling feature to update records is enabled or disabled and subsequently branches to path N or path Y. The optional sampling feature can be enabled/disabled during the initiation procedures of block 720, or changed at any time by the controller 102 or user/operator intervention.

In block 722, if the optional sampling feature is determined to be disabled, then path N is taken, otherwise path Y is taken. Path Y of block 722 leads to block 726, labeled as IO command within sampling, representing the enablement of the optional sampling feature. Block 726 involves waiting and monitoring for either an IO command or a sample trigger event without any IO command. The sample trigger event indicates that records should be updated to ensure that the records are current, and not stale from extended periods IO commands.

When an IO command is detected in block 726, path Y is taken to block 728, labeled as update records. Block 728 represents the process of updating the records of the DSDs 106, notifying the controller 102 that the records have been updated, and branching back to block 722 (branch back not shown for simplicity of presentation) to resume/restart the process flow.

Returning back to block 726, if the sample trigger event and no IO command is detected in block 726, path N is taken to block 730, labeled as issue a background command. Block 730 represents the autonomous generation of at least one background command that includes the reading of the IO data from one or more of the DSDs 106 followed by a branch to block 732, labeled as execute the background command to get the data.

Block 732 represents executing the background command from block 730 to gather the data before branching to block 728. Block 728 updates the records of the DSDs 106, notifies the controller 102 that the records have been updated, and subsequently branches back to block 722 (branch back not shown for simplicity of presentation) to resume/restart the process flow.

Returning back to block 722, if an IO command is detected in block 722, then irrespective of any sample trigger event, path N is taken to block 724. Block 724, labeled as any user IO command, is a decision that checks for either a user IO command or a non-user command. If a user IO command is detected in block 724, path Y is taken to block 728 to update the records of the DSDs 106 and notify the controller 102 that records have been updated before branching back to block 722 (branch back not shown for simplicity of presentation) to resume/restart the process flow.

Returning back to block 724, if block 724 does not detect an IO command, then path N to block 734 is taken to evaluate a non-user command. In block 734, labeled as any controller triggered command, if the non-user command is determined to be a controller command, then path Y is taken to block 732, labeled as execute the background command to get the data. Block 732 represents an execution of a controller command, similar to the background command in block 730. After execution of the controller command, block 732 branches to block 728. In block 728, the records are updated and the controller 102 is notified that the records have been updated before branching back to block 722 (branch back not shown for simplicity of presentation) to resume/restart the process flow.

Returning back to block 734, if the non-user command is determined to not be a controller command in block 734, path N is taken to block 736. Block 736, labeled as no update, represents a decision to not update any of the records and to branch back to block 722 to resume/restart the process flow.

It has been discovered that the combination of the RMU 122 and the controller 102 with the DSDRMU 116 and an optional sampling frequency feature to update records of the DSDs, optimizes the triggering and decision processing of record updating by forming a self-managed two-leveled parallel architecture that results in an autonomous, fast, efficient, and low overhead record updating management process.

Figure 8:
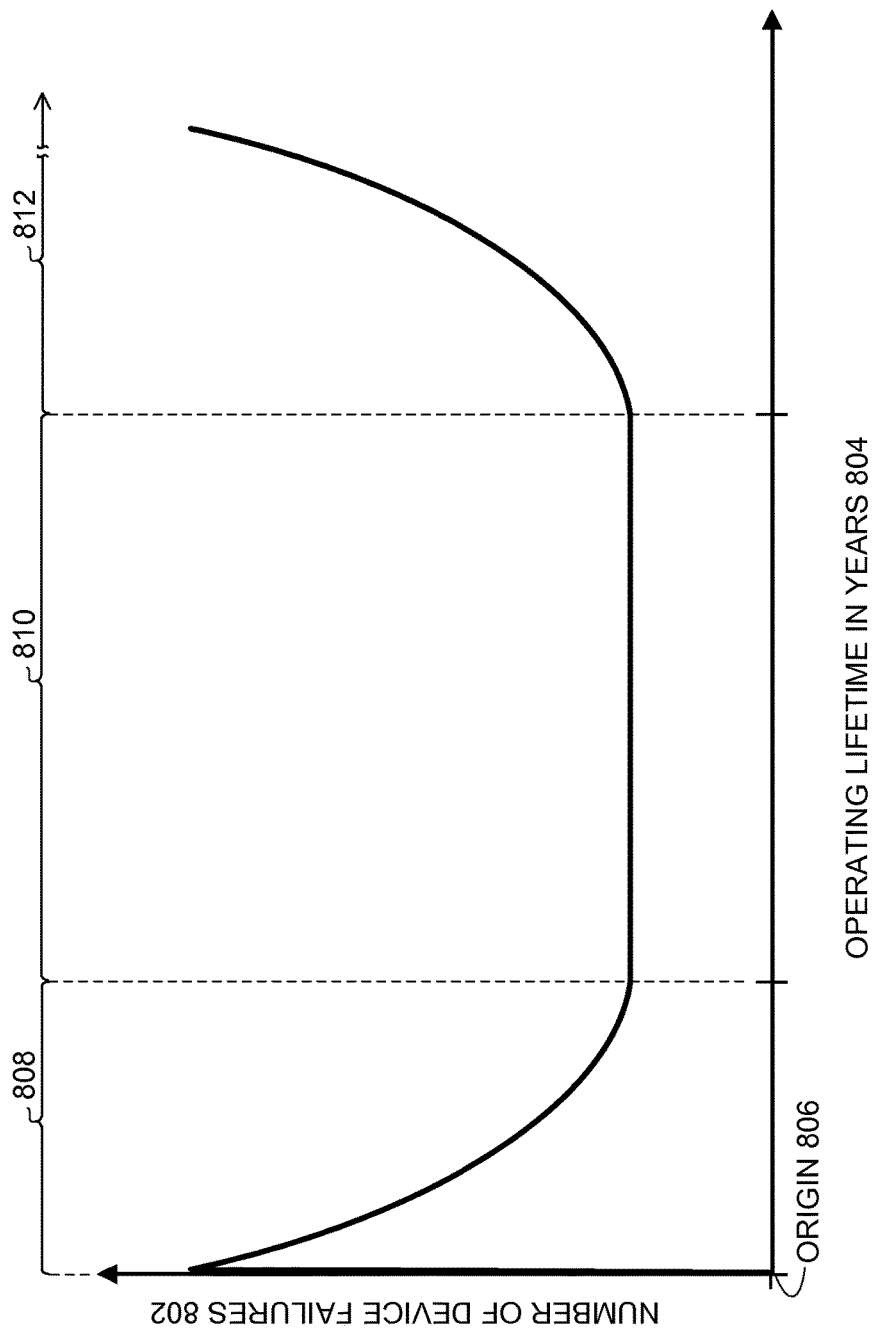
FIG. 8 shows an example of a graph depicting failure characteristic trends automatically monitored by the controller and the Storage Unit to dynamically maintain a predetermined reliability range of the Adaptive Declustered RAID Arrays according to various embodiments.

Referring now to FIG. 8, therein is shown an example of a graph depicting failure characteristic trends automatically monitored by the controller 102 and the SU 104 to dynamically maintain a predetermined reliability range of the Adaptive Declustered RAID Arrays 114 according to various embodiments. The graph of FIG. 8 is an example of failures that are detected, evaluated, and trigger automatic reconfigurations based on reliability targets. The graph does not represent all possible failure characteristics and behavior of the DSDs. The approaches, methods, features, and processes described below may be used independently of one another or may be combined in various ways for any failure and is not limited to or by the graph of FIG. 8. The graph plot shows a y-axis representing a Number of Device Failures (NDF) 802 of storage drives, such as the DSDs 106 of FIG. 1A, as an example.

An x-axis represents an Operating Lifetime Year (OLY) 804 corresponding to a NDF 802 value on the y-axis for a RAID storage systems. An origin 806, at an intersection of the x-axis and the y-axis, on the graph represents a first day of a first month of operation of the RAID storage system with zero failures. Early life failures (ELF) 808, Random Failures (RF) 810, and Wear Out Failures (WOF) 812 are three major storage device life stages identified in the graph.

The ELF 808 stage occurs in the initial years of life of the RAID storage systems and can depend on system class. For example, a consumer system class can have higher failures than a military system class storage system which is often built of military specification components and stress tested with accelerated early life stress tests prior to use by the users.

The controller 102 of FIG. 1A with the RMU 122 of FIG. 1A continually monitors the RI 124 of FIG. 1A and the RS 126 of FIG. 1A. The controller 102 detects changes such as decreasing reliabilities of the DSDs 106 due to emanate or sudden failures that are detected. The controller 102 performs preemptive actions that include reconfigurations, allocations, and reallocations of the DSDs 106 using numerous methods and techniques described earlier in FIGS. 1A and 1B through FIGS. 7A and 7B.

The RF 810 stage can span from 70% to 90% of an entire lifespan of RAID storage systems, depending on the system class. Since the failures are far and few, the neural network based monitoring and the APA 142 described in FIG. 3 provide a detection granularity that is very effective for fast preemptive detections and responses during the RF 810 stage. The controller 102 can perform reconfigurations, allocations, reallocations, or any combination thereof in response to small subtle changes in reliability, characteristic of storage devices in the RF 810 stage.

The detection granularity is also especially important because the failure rate of the disk drive can be from a higher bit error rate after certain times of usage, head wear, media grown defects, and other similar conditions, resulting in a reduction in MTTF or unstable swings of the actual MTTF measured by customer. The controller 102 and the SU 104 use numerous methods and techniques to address the RF 810 stage described earlier in FIGS. 1A and 1B through FIGS. 7A and 7B, and especially in FIGS. 3-5.

The WOF 812 stage is a crucial period when failures of the storage devices can be abrupt or sudden. The controller 102 and the SU 104 maintains the reliability and availability of the user data throughout the WOF 812 stage by providing continued monitoring of multiple metrics with fast detection and preemptive action. The fast detection and preemptive action is a very crucial and vital requirement needed to maintain continued storage availability and data integrity. The controller 102 addresses the WOF 812 stage with fast detection and preemptive action as previously described in FIGS. 1A and 1B through FIGS. 7A and 7B.

It has been discovered that the Adaptive Declustered RAID Array 114 can effectively compensate for the ELF 808, the RF 810, and the WOF 812 stages of the DSDs 106 by maximizing the reliability, availability, and performance throughout the entire lifespan of the DSDs 106 to provide the product users with a Return On Investment (ROI) of the Adaptive Declustered RAID Array 114 higher than a ROI of other declustured or non-declustered RAID array product.

Any suitable control circuitry may be employed to implement the flow diagrams in the above embodiments, such as any suitable integrated circuit or circuits. For example, the control circuitry may be implemented within a read channel integrated circuit, or in a component separate from the read channel, such as a disk controller, or certain operations described above may be performed by a read channel and others by a disk controller. In one embodiment, the read channel and disk controller are implemented as separate integrated circuits, and in an alternative embodiment they are fabricated into a single integrated circuit or system on a chip (SOC). In addition, the control circuitry may include a suitable preamp circuit implemented as a separate integrated circuit, integrated into the read channel or disk controller circuit, or integrated into a SOC. In addition, any of the above described modules and components may be implemented in firmware, software, hardware, or any combination thereof.

In one embodiment, the control circuitry comprises a microprocessor executing instructions, the instructions being operable to cause the microprocessor to perform the flow diagrams described herein. The instructions may be stored in any computer-readable medium. In one embodiment, they may be stored on a non-volatile semiconductor memory external to the microprocessor, or integrated with the microprocessor in a SOC. In another embodiment, the instructions are stored on the disk and read into a volatile semiconductor memory when the disk drive is powered on. In yet another embodiment, the control circuitry comprises suitable logic circuitry, such as state machine circuitry.

The various features and processes described above may be used independently of one another, or may be combined in various ways. All possible combinations and sub-combinations are intended to fall within the scope of this disclosure. In addition, certain method, event or process blocks may be omitted in some implementations. The methods and processes described herein are also not limited to any particular sequence, and the blocks or states relating thereto can be performed in other sequences that are appropriate. For example, described tasks or events may be performed in an order other than that specifically disclosed, or multiple may be combined in a single block or state. The example tasks or events may be performed in serial, in parallel, or in some other manner. Tasks or events may be added to or removed from the disclosed example embodiments. The example systems and components described herein may be configured differently than described. For example, elements may be added to, removed from, or rearranged compared to the disclosed example embodiments.

While certain example embodiments have been described, these embodiments have been presented by way of example only, and are not intended to limit the scope of the inventions disclosed herein. Thus, nothing in the foregoing description is intended to imply that any particular feature, characteristic, step, module, or block is necessary or indispensable. Indeed, the novel methods and systems described herein may be embodied in a variety of other forms; furthermore, various omissions, substitutions and changes in the form of the methods and systems described herein may be made without departing from the spirit of the embodiments disclosed herein.

The resulting method, process, apparatus, device, product, and/or system is straightforward, cost-effective, uncomplicated, highly versatile, accurate, sensitive, and effective, and can be implemented by adapting known components for ready, efficient, and economical manufacturing, application, and utilization. Another important aspect of various embodiments is that they valuably supports and services the historical trend of reducing costs, simplifying systems, and increasing performance.

These and other valuable aspects of the various embodiments consequently further the state of the technology to at least the next level.

While the various embodiments have been described in conjunction with a specific best mode, it is to be understood that many alternatives, modifications, and variations will be apparent to those skilled in the art in light of the aforegoing description. Accordingly, the embodiments are intended to embrace all such alternatives, modifications, and variations that fall within the scope of the included claims. All matters set forth herein or shown in the accompanying drawings are to be interpreted in an illustrative and non-limiting sense.

What is claimed is:

1. An apparatus, comprising:
   an adaptive declustered RAID array comprising data storage devices (DSDs), the DSDs comprising data chunks, each of the data chunks allocated as a corresponding one of data, a local parity, and a global parity, the local parity to protect the data, the global parity to protect the local parity; and
   processing circuitry configured to:
      generate, at a first time according to a sampling frequency, a first reliability indicator, the first reliability indicator indicating a first reliability status of at least a portion of the adaptive declustered RAID array;
      generate, at a second time after the first time according to the sampling frequency, a second reliability indicator, the second reliability indicator indicating a second reliability status of the at least the portion of the adaptive declustered RAID array;
      compare the first reliability indicator and the second reliability indicator;
      determine whether a difference between the first reliability indicator and the second reliability indicator is greater than a predetermined threshold; and
      in response to determining that the difference is greater than the predetermined threshold:
         evaluate upgrade and downgrade configuration rules to determine whether to upgrade or to downgrade the adaptive declustered RAID array; and
         reallocate the data chunks, by dynamically increasing or decreasing the data chunks allocated as the local parity, the global parity, or a combination thereof, according to the evaluation of the upgrade and downgrade configuration rules.

2. The apparatus of claim 1, further comprising:
   DSD reliability managing circuitry in one of the DSDs; and
   a reliability communication interface connected between the processing circuitry and the DSD reliability managing circuitry to provide a dedicated interface for managing reliability of the adaptive declustered RAID array.

3. The apparatus of claim 1, wherein reallocating the data chunks according to the evaluation of the upgrade and downgrade configuration rules comprises reallocating, as a spare data chunk, at least one of the data chunks allocated as one of the local parity and the global parity based on the second reliability indicator.

4. The apparatus of claim 1, wherein reallocating the data chunks according to the evaluation of the upgrade and downgrade configuration rules comprises reallocating, as the global parity, one of the data chunks allocated as the local parity, based on the second reliability indicator.

5. The apparatus of claim 1, wherein reallocating the data chunks according to the evaluation of the upgrade and downgrade configuration rules comprises reallocating, as the local parity, one of the data chunks allocated as the global parity, based on the second reliability indicator.

6. The apparatus of claim 1, further comprising central reliability monitoring circuitry configured to dynamically evaluate the second reliability indicator.

7. The apparatus of claim 1, wherein reallocating the data chunks according to the evaluation of the upgrade and downgrade configuration rules comprises reallocating the data chunks based on a neural network reliability warning scheme of reliability metrics.

8. The apparatus of claim 1, wherein reallocating the data chunks according to the evaluation of the upgrade and downgrade configuration rules comprises reallocating the data chunks based on Bayesian analytical approaches.

9. The apparatus of claim 1, wherein the data chunks further comprise a spare data chunk.

10. The apparatus of claim 9, wherein reallocating the data chunks according to the evaluation of the upgrade and downgrade configuration rules comprises reallocating the spare data chunk as the local parity based on the second reliability indicator.

11. The apparatus of claim 9, wherein reallocating the data chunks according to the evaluation of the upgrade and downgrade configuration rules comprises real locating the spare data chunk as the global parity based on the second reliability indicator.

12. The apparatus of claim 9, wherein:
   reallocating the data chunks according to the evaluation of the upgrade and downgrade configuration rules comprises reallocating the spare data chunk for data migration of user data from one of the data chunks to the spare data chunk, based on the second reliability indicator.

13. The apparatus of claim 1, wherein the processing circuitry is further configured to generate the second reliability indicator based on early life failure, random failure, and wear out failure life cycles of the DSDs.

14. The apparatus of claim 1, further comprising a user interface connected to the processing circuitry for sending reliability directives to the processing circuitry for dynamically increasing or decreasing a number of the data chunks.

15. The apparatus of claim 1, wherein the second reliability indicator is indicative of mean time to data loss or mean time to failure of the at least the portion of the adaptive declustered RAID array at the second time.

16. A method of operating an apparatus, the method comprising:
   configuring an adaptive declustered RAID) array comprising data storage devices (DSDs), the DSDs comprising data chunks, each of the data chunks allocated as a corresponding one of data, a local parity, and a global parity, the local parity to protect the data, the global parity to protect the local parity;
   generating, by processing circuitry, at a first time according to a sampling frequency, a first reliability indicator, the first reliability indicator indicating a first reliability status of at least a portion of the adaptive declustered RAID array;
   generating, by the processing circuitry, at a second time after the first time according to the sampling frequency, a second reliability indicator, the second reliability indicator indicating a second reliability status of the at least the portion of the adaptive declustered RAID array;

determining, by the processing circuitry, a difference between the first reliability indicator and the second reliability indicator; and reallocating, by the processing circuitry, the data chunks, by dynamically increasing or decreasing the data chunks allocated as the local parity, the global parity, or a combination thereof, according to the difference.

17. The method of claim 16, further comprising:
connecting a reliability communication interface between a control circuit and DSD reliability managing circuitry in one of the DSDs to provide a dedicated interface for managing reliability of the adaptive declustered RAID array.

18. The method of claim 16, wherein reallocating the data chunks includes reallocating at least one of the data chunks, which is allocated as one of the local parity and the global parity, to be a spare data chunk, based on the second reliability indicator.

19. The method of claim 16, wherein reallocating the data chunks includes reallocating a data chunk which is allocated as the local parity, to be the global parity, based on the second reliability indicator.

20. The method of claim 16, wherein reallocating the data chunks includes reallocating a data chunk, which is allocated as the global parity to be the local parity, based on the second reliability indicator.

21. The method of claim 16, further comprising dynamically evaluating the second reliability indicator by central reliability monitoring circuitry.

22. The method of claim 16, wherein reallocating the data chunks is based on a neural network reliability warning scheme of reliability metrics.

23. The method of claim 16, wherein reallocating the data chunks is based on Bayesian analytical approaches.

24. The method of claim 16, wherein configuring the adaptive declustered RAID array includes configuring a spare data chunk.

25. The method of claim 7, further comprising reallocating the spare data chunk as the local parity based on the second reliability indicator.

26. The method of claim 24, further comprising reallocating the spare data chunk as the global parity based on the second reliability indicator.

27. The method of claim 24, further comprising:
allocating the spare data chunk for data migration of user data from one of the data chunks to the spare data chunk, based on the second reliability indicator.

28. The method of claim 16, wherein reallocating the data chunks includes reallocating the data chunks based on early life failure, random failure, and wear out failure life cycles of the DSDs.

29. The method of claim 16, further comprising connecting a user interface to the processing circuitry for sending reliability directives to a controller for dynamically increasing or decreasing a number of the data chunks.

30. A non-transitory computer readable medium including stored thereon instructions to be executed by processing circuitry, the instructions when executed by the processing circuitry cause the processing circuitry to:

configure an adaptive declustered RAID array comprising data storage devices (DSDs), the DSDs comprising data chunks, each of the data chunks allocated as a corresponding one of data, a local parity, and a global parity, the local parity to protect the data, the global parity to protect the local parity;

generate, at a first time according to a sampling frequency, a first reliability indicator, the first reliability indicator indicating a first reliability status of at least a portion of the adaptive declustered RAID array;

generate, at a second time after the first time according to the sampling frequency, a second reliability indicator, the second reliability indicator indicating a second reliability status of the at least the portion of the adaptive declustered RAID array;

determine a difference between the first reliability indicator and the second reliability indicator; and reallocate the data chunks, by dynamically increasing or decreasing the data chunks allocated as the local parity, the global parity, or a combination thereof, according to the difference.

31. A controller, comprising:
means for configuring an adaptive declustered RAID array comprising data storage devices (DSDs), the DSDs comprising data chunks, each of the data chunks allocated as a corresponding one of data, a local parity, and a global parity, the local parity to protect the data, the global parity to protect the local parity;

means for generating a first reliability indicator, the first reliability indicator indicating a first reliability status of at least a portion of the adaptive declustered RAID array;

means for generating a second reliability indicator, the second reliability indicator indicating a second reliability status of the at least the portion of the adaptive declustered RAID array;

means for determining a difference between the first reliability indicator and the second reliability indicator; and means for reallocating the data chunks, by dynamically increasing or decreasing the data chunks allocated as the local parity, the global parity, or a combination thereof according to the difference.

* * * * *